(12) United States Patent
Li et al.

(10) Patent No.: US 12,730,354 B2
(45) Date of Patent: Sep. 8, 2026

(54) TIME-MULTIPLEXED PHOTONIC COMPUTER

(71) Applicant: California Institute of Technology, Pasadena, CA (US)

(72) Inventors: Gordon H.Y. Li, Pasadena, CA (US); Midya Parto, Pasadena, CA (US); Ryoto Sekine, Pasadena, CA (US); James Williams, Simi Valley, CA (US); Christian Leefmans, Pasadena, CA (US); Alireza Marandi, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 165 days.

(21) Appl. No.: 18/448,700

(22) Filed: Aug. 11, 2023

(65) Prior Publication Data

US 2024/0061316 A1 Feb. 22, 2024

Related U.S. Application Data

(60) Provisional application No. 63/441,387, filed on Jan. 26, 2023, provisional application No. 63/397,097, filed on Aug. 11, 2022.

(51) Int. Cl.

| | |
|---|---|
| ***G02F 1/39*** | (2006.01) |
| ***G06E 3/00*** | (2006.01) |

(52) U.S. Cl.

CPC ............... *G02F 1/39* (2013.01); *G06E 3/001* (2013.01)

(58) Field of Classification Search

CPC ........... G02F 1/39; G02F 1/392; G06E 3/001; G06N 3/044; G06N 3/048; G06N 3/0675

See application file for complete search history.

(56) References Cited

U.S. PATENT DOCUMENTS

| | | | | |
|---|---|---|---|---|
| 10,630,392 | B2 * | 4/2020 | Kikawada | H04B 10/532 |
| 10,763,974 | B2 * | 9/2020 | Bunandar | G06F 17/16 |

(Continued)

FOREIGN PATENT DOCUMENTS

| | | | | |
|---|---|---|---|---|
| JP | 2018147229 A | * | 9/2018 | |
| JP | 2023167667 A | * | 11/2023 | G02F 1/39 |

(Continued)

OTHER PUBLICATIONS

Li, G.H.Y., et al., "Photonic elementary cellular automata for simulation of complex phenomena", Light: Science & Applications, 2023, pp. 1-9, vol. 12, No. 132.

*Primary Examiner* — William Lu

(74) *Attorney, Agent, or Firm* — GATES & COOPER LLP

(57) ABSTRACT

A device including a programmable photonic processor configured to operate on optical pulses to perform computational sequences of linear operations and nonlinear operations each based on a parametric nonlinear optical process; a memory coupled to the processor and programmable to store or accumulate the analog optical pulse amplitudes of the optical pulses; a control circuit controlling the transfer of the analog optical pulse amplitudes between the processor and the memory according to a computation schedule; and wherein information is multiplexed in time by encoding the information onto the analog optical pulse amplitudes of the optical pulses occupying time bins at a fixed repetition rate such that the optical pulses, occupying different ones of the time bins, can be made to interact using appropriate temporal delays.

21 Claims, 24 Drawing Sheets

(56) References Cited

U.S. PATENT DOCUMENTS 11,093,215 B2 * 8/2021 Harris .................... G06F 1/06
11,281,972 B2 * 3/2022 Shen .................... G06F 17/14
11,700,078 B2 * 7/2023 Bunandar ............ H04B 10/556
398/43
11,734,556 B2 * 8/2023 Meng .................. G06N 3/0675
706/43
11,768,662 B1 * 9/2023 Harris .................. G06E 3/008
708/607
12,034,481 B2 * 7/2024 Hajimiri ................ H04B 10/25
2006/0181710 A1 * 8/2006 Kachanov ............. G01N 21/39
356/437
2016/0131960 A1 * 5/2016 Xie ......................... G02F 1/39
359/329
2016/0162798 A1 * 6/2016 Marandi .................. G02F 3/00
708/191
2018/0081255 A1 * 3/2018 Reimer .................. G02F 1/365
2020/0076149 A1 * 3/2020 Papp .................... G02F 1/0344
2020/0274703 A1 * 8/2020 Lukens ................ H04L 9/0858
2020/0285131 A1 * 9/2020 Marandi .................. G02F 1/39
2020/0364597 A1 * 11/2020 Friedlander .............. G06N 5/01
2021/0174235 A1 * 6/2021 Kues ......................... G02F 1/00
2021/0374611 A1 * 12/2021 Ronagh ................. G06N 20/00
2023/0063092 A1 * 3/2023 Heiniger ................. H04J 14/02
2023/0153677 A1 * 5/2023 Takesue ............... G06N 3/0675
706/45
2023/0353351 A1 * 11/2023 Lukens ................ H04L 9/0858

FOREIGN PATENT DOCUMENTS

WO WO-2021201279 A1 * 10/2021 ............... G02F 1/39
WO WO-2025193599 A1 * 9/2025 ............... G06E 3/00

* cited by examiner

TIME-MULTIPLEXED PHOTONIC COMPUTER

CROSS REFERENCE TO RELATED APPLICATIONS

This application claims the benefit under 35 U.S.C. Section 119(e) of:

U.S. Provisional Application No. 63/441,387, filed Jan. 26, 2023, by Gordon H. Y. Li, Midya Parto, Ryoto Sekine, and Alireza Marandi, entitled "TIME-MULTI PLEXED PHOTONIC COMPUTER" (CIT 8954-P); and U.S. Provisional Application No. 63/397,097, filed Aug. 11, 2022, by Gordon H. Y. Li, James Williams, Christian Leefmans, and Alireza Marandi, entitled "TIME-MULTI PLEXED OPTOELECTRONIC COMPUTER" (CIT 8681-P);

both of which applications are incorporated by reference herein.

STATEMENT REGARDING FEDERALLY SPONSORED RESEARCH AND DEVELOPMENT

This invention was made with government support under Grant No. CCF1918549 awarded by the National Science Foundation. The government has certain rights in the invention.

BACKGROUND OF THE INVENTION

1. Field of the Invention

The present disclosure relates to photonic computing systems and methods of making the same.

2. Description of the Related Art

The disclosure references a number of references which are incorporated by reference herein.

Time-Multiplexed Photonic Simulators

The concept of synthetic dimensions for simulating lattices and graphs allows photonic systems to possess dimensionality exceeding the number of physical spatial degrees of freedom (Yuan et al. 2018). Time-multiplexing is a particularly convenient and resource-efficient method in photonics that exploits one or more synthetic temporal dimension/s. In this method, lattice sites or graph nodes are represented by sequential pulses of light with a fixed repetition rate and information is encoded into the amplitude/phase of the light pulses. Therefore, distances in the synthetic temporal dimension correspond to relative time differences in the physical system and nodes may be coupled using delay lines of appropriate length. This idea has been implemented in several special-purpose photonic computers using optical fiber platforms to simulate a variety of phenomena including topological physics (Leefmans et al. 2022a; Weidemann et al. 2020), non-Hermitian physics (Nasari et al., 2022 Parto et al., 2022), and cellular automata (Li et al. (2022a). So far, these photonic simulators have mainly utilized only linear photonic couplings, however, the interplay with optical nonlinearity has also been studied (Leefmans et al. 2022b). Although these time-multiplexed photonic systems can efficiently simulate some lattice systems with local neighbourhood couplings, they lack the flexibility to be used for more general photonic computing.

Coherent Ising Machines

Combinatorial optimization problems are ubiquitous in diverse fields ranging from biological to social and economic sciences (Karp, 1972). On many practical occasions, such problems belong to a complexity class known as NPhard. This typically means that the computational resources based on conventional von-Neumann architectures required to solve such problems tend to grow exponentially with the problem size. To mitigate this, unconventional physical solvers have recently emerged as an alternative paradigm for computing. Among different NP-hard problems, perhaps the most amenable model for direct implementation in physical solvers is that associated with the Ising Hamiltonian (De las Cuevas and Cubitt, 2016). In this regard, it has been formally shown that finding the solution to any NP-hard problem—including travelling salesman, the nurse scheduling, and knapsack problems—can be effectively mapped into the search for the ground state of the Ising Hamiltonian with predefined exchange interactions (Lucas, 2014). By using a suitable physical system that exhibits nonlinear dynamics programmed to reach the ground state of such a Hamiltonian, i.e. an Ising machine, one can find the solution to the original optimization task.

The Ising problem can be formally expressed as finding the minimum energy associated with the Hamiltonian $$H_{Ising} = -\sum_{i,j=1}^{N} J_{ij}\sigma_i\sigma_j - \sum_{i=1}^{N} h_i\sigma_i, \tag{1}$$

where $\sigma_i=\pm1$ represent binary-valued spin values, $J_{i,j}$ are the elements of the spin coupling matrix, and $h_i$ denote the Zeeman terms arising from a constant bias. Early demonstrations of Ising machines involved using quantum annealers based on superconducting circuits wherein the binary spins are implemented by flux qubits (Johnson et al., 2011). Such a system is then engineered to evolve from an initially prepared configuration to the target Hamiltonian of Eq. 1 according to a quantum annealing protocol. Other types of Ising machines were subsequently demonstrated in trapped ions (Kim et al. 2010) as well as CMOS devices (Yamaoka et al., 2015). An alternative approach for realizing Ising solvers was later adopted that involved using a network of time-multiplexed degenerate optical parametric oscillators (DOPOs), known as the coherent Ising machine (CIM) (Marandi et al., 2014). In contrast to previous schemes, CIMS map the target Hamiltonian to a loss function which is naturally minimized by the oscillator network as it operates above the oscillation threshold (Inagaki et al. 2016b). Compared to annealing-based solvers demonstrated so far, such CIMs can offer larger connectivity among the artificial spins and are therefore expected to solve Ising problems with dense couplings more efficiently (Hamerly et al. 2019b).

In a CIM, each DOPO is represented by a temporal pulse in an optical cavity with a phase-sensitive amplifier (PSA). This can be achieved using the $\chi^{(2)}$ nonlinearity of periodically poled lithium niobate (PPLN) (Honjo et al. 2021, Inagaki et al. 2016b Marandi et al. 2014, McMahon et al., 2016). When operated above threshold, the i-th oscillator undergoes a pitchfork bifurcation and subsequently exhibits a binary phase equal to 0 or $\pi$, corresponding to a $\sigma_i$=1 or −1 in Eq. 1 respectively. In addition, the interactions $J_{ij}$ among these artificial spins are provided by mutual injections of the optical fields between the $i^{th}$ and $j^{th}$ OPOs. When the gain is gradually changed by increasing the pump intensity in the PSA, the network settles in a steady state in the oscillation regime. The ground state of the target Ising Hamiltonian can then be retrieved by coherently detecting the phases associated with the constituent DOPOs.

There currently exists many methods of implementing CIMS, the main categories of which are shown in FIG. 1. The early works on CIMS (Marandi et al. 2014; Takata et al. 2016) were performed using the structure shown in FIG. 11(*a*). Here the synchronously pumped OPO cavity length scales with N, the size of the problem to be solved. In every round trip of the cavity, part of the signal is coupled into delay arms, the length of which is determined to perform spin-spin couplings between $i^{th}$ and $j^{th}$ OPO pulses in the cavity. While this method enables an all optical way of solving optimization problems, to solve a problem with N spins, N−1 physical delay arms would have to be prepared and their position precisely aligned to reflect the coupling strengths. Thus this architecture can in principle be used to solve problems with large N, however, preparing the necessary delay lines can be prohibitive in practice.

An alternative method to implement the mutual couplings necessary to realize the Ising Hamiltonian is to replace the optical delay lines with balanced homodyne detection followed by optoelectronic feedback as shown in FIG. 1.(*b*) (Honjo et al. 2021; McMahon et al. 2016). Using this measurement feedback method, large Ising Hamiltonians corresponding to various graphs with dense connections among the spins can be readily implemented in a way that is robust to optical losses and random phase errors (Inagaki et al. 2016a). Recently, this architecture was used to demonstrate a 100k-spin CIM (Honjo et al. 2021). In addition, more complicated scenarios wherein external magnetic fields lead to Zeeman terms in the Ising Hamiltonian can also be realized using this technique (Takesue et al. 2020). Despite the great flexibility of this architecture, as discussed in (Honjo et al. 2021), the main bottleneck of this scheme is the $O(N^2)$ growth in the size and power consumption of the field-programmable gate array (FPGA) used in the optoelectronic feedback segment. The FPGA is needed to perform large scale matrix-vector multiplication to represent the Ising spin couplings during each iteration of the Ising machine. Furthermore, the optoelectronic conversions dictate that the computation speed of this architecture is fundamentally limited by the electronic bandwidth.

Finally, another possibility is to reverse the roles of the optics and electronics in the measurement feedback architecture (Böhm et al., 2019, Prabhu et al., 2020). As depicted in FIG. 11(*c*), these approaches exploit the success in photonics to perform fast linear algebra calculations (or at least unitary operations), and use electronics for memory. In this scheme the required nonlinearity is performed electronically. Again, these hybrid optoelectronic implementations of CIMs are fundamentally limited by the electronic bandwidth.

Neuromorphic Photonic Computers

Time-multiplexed photonic architectures have also been proposed for neuromorphic or brain-inspired computing. The motivation for these systems is to efficiently accelerate machine learning and artificial intelligence workloads, which are typically poorly suited for conventional von-Neumann computers. For example, the time domain evolution of optical resonators with programmable phases and nonlinear fibers can be interpreted as a feed-forward deep neural network (Pankov et al. 2022, Peng et al. 2021). However, these systems do not correspond to existing deep learning models and have reduced expressive power due to the limited linear and nonlinear operations involved. On the other hand, optical resonators with recurrent feedback can act as recurrent neural networks or reservoir computers (Duport et al. 2016, Larger et al. 2017). They have been demonstrated for temporal information processing tasks, but also lack flexibility in their coupling topologies and rely on slower optoelectronic nonlinearities. It remains unclear whether these systems can realize advantages over electronic hardware accelerators for neuromorphic computing.

What is needed, then, are improved methods of implementing photonic computers. The present disclosure satisfies this need.

SUMMARY OF THE INVENTION

Illustrative embodiments of the inventive subject matter disclosed herein include, but are not limited to, the following.

1. A device, comprising:

a programmable photonic processor configured to operate on optical pulses to perform computational sequences of linear operations and nonlinear operations each based on a parametric nonlinear optical process;

a memory coupled to the processor and programmable to store or accumulate the analog optical pulse amplitudes of the optical pulses;

a control circuit controlling the transfer of the analog optical pulse amplitudes between the processor and the memory according to a computation schedule; and wherein information is multiplexed in time by encoding the information onto the analog optical pulse amplitudes of the optical pulses occupying time bins at a fixed repetition rate such that the optical pulses, occupying different ones of the time bins, can be made to interact using appropriate temporal delays.

2. The device of embodiment 1, wherein:

the processor comprises a first cavity comprising a first optical parametric oscillator (OPO);

the memory comprises a second cavity comprising a second OPO; and the OPOs each generate the optical pulses comprising signal and/or idler pulses in response to a pump pulse using the parametric nonlinear optical process comprising at least one of a second order process or third order parametric process; and the first cavity and the second cavity are coupled by programmable couplers to allow the partial or complete transfer of the optical pulses between the first cavity and the second cavity by means of coherent interference of the optical pulses.

3. The device of embodiment 2, wherein:

the signal pulses comprise one or more input pulses and one or more output pulses;

the control circuit implements the computation schedule by:

selecting each of the operations on each of the input pulses, to form the output pulses, by setting an amplitude of the pump pulses in the first OPO and the second OPO during the operations, such that the OPOs can be operated in either a linear regime in which the parametric gain equals the roundtrip linear loss, or in a highly nonlinear regime in which the parametric gain is saturated; and controlling the transfer of one or more of the signal pulses comprising the analog optical pulse amplitudes between the processor and the memory.

4. The device of embodiment 3, wherein:

the computation schedule comprises a database comprising a sequence of modulator levels each assigned to a different one of the time bins associated with a different one of the signal pulses; and the circuit executes the computation schedule by applying the modulator levels to:

the couplers to control the transfer of the signal pulses; and a modulator to control the amplitude of the pump pulses, and during the time bins associated with the appropriate signal pulses.

5. The device of embodiment 4, wherein:

the interactions implementing the linear operation comprise a coherent interference between one of the signal pulses and one or more of the other signal pulses in the OPOs; and the control circuit controls the linear operation by modulating the intensities and phases of the signal pulses inputted into the couplers between the first OPO and the second OPOs.

6. The device of embodiment 5, wherein the type of the linear operation comprises at least one of addition or multiplication.

7. The device of embodiment 5, wherein the multiplexing in time is implemented by having the first OPO and second OPO each having cavity lengths tuned to allow one of the signal pulses to interact with any other of the signal pulses over a plurality of repetition periods of the pulses.

8. The device of embodiment 5, wherein the first OPO has a first cavity length configured to support N signal pulses spaced by the fixed repetition period and the second OPO comprises a second cavity length configured to support N+1 signal pulses.

9. The device of embodiment 3, wherein:

the nonlinear operations each comprise a nonlinear activation function comprising saturated parametric amplification or suppression of the one of the signal pulses generated from one of the pump pulses, depending on a phase difference between the one of the pump pulses and the signal pulse;

the control circuit sets the amplitude and phase of pump pulses in accordance with the computation schedule to control the nonlinear operations; so that:

the one of the signal pulses experiences an amplification or a suppression that is gated by the one of the pump pulses.

10. The device of embodiment 4, further comprising a clock controlling the fixed repetition rate of the optical pulses and distribution of the optical pulses in the time bins.

The device of embodiment 10, wherein the repetition rate is greater than 10 GHz.

11. The device of embodiment 10, further comprising:

a time division multiplexer for encoding information on multiple sequences of the optical pulses with a repetition rate in the range of 1-100 GHz, using modulators programmable to encode information on each of the pulses, and a combiner for combining the pulse sequences into one sequence of pulses with the fixed repetition rate in the range of 0.1-10 THz.

12. The device of embodiment 12, further comprising:

a time division demultiplexer comprising splitter for splitting the one sequence of pulses into a plurality of pulse sequences with a lower repetition rates;

a plurality of switches; and a plurality of detectors for measuring the analog optical pulse amplitudes or phases of the optical pulses selected by the switches.

13. The device of any of the embodiments, wherein the second OPO is replaced with a virtual memory comprising an electronic circuit (e.g., FPGA or ASIC or other integrated circuit or processor) programmable to store the analog optical pulse amplitudes.

14. The device of embodiment 14, wherein the memory further comprises:

photodetectors for detecting the optical pulses and outputting RF signals in response thereto; and an RF processor for processing the RF signals.

15. The device of embodiment 15, wherein the memory further comprises:

an analog to digital converter for converting the RF signals to digital signals for storage in the memory; and a digital to analog converter for converting the digital signals to analog signals configured for driving a modulator modulating the optical pulses with the analog optical pulse amplitudes.

16. The device of any of the embodiments, wherein the control circuit is programmable to implement the processor as an Ising machine, a reservoir computer, a cellular automaton, or for machine learning.

17. The device of any of the embodiments, further comprising optical gates or electrical gates for modulating the couplers with optical signals or electrical signals.

18. The device of embodiment 1, wherein the processor and the memory or the couplers are connected via optical fiber.

19. A method for computing, comprising:

using a processor comprising a first OPO, operating on optical pulses to perform computational sequences of linear operations and nonlinear operations each based on a parametric nonlinear optical process in the first OPO;

storing or accumulating the analog optical pulse amplitudes of the optical pulses in a memory;

controlling a transfer of the analog optical pulse amplitudes between the processor and the memory according to a computation schedule; and wherein information is multiplexed in time by encoding the information onto the analog optical pulse amplitudes of the optical pulses occupying time bins at a fixed repetition rate such that the optical pulses, occupying different ones of the time bins, can be made to interact using appropriate temporal delays.

20. The device of embodiment 2, wherein the memory comprising the second OPO stores the optical pulses in the second cavity.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

First Embodiment: Time-Multiplexed Photonic Computer Architecture With Optical Memory a. Architecture Embodiment

Figure 1:
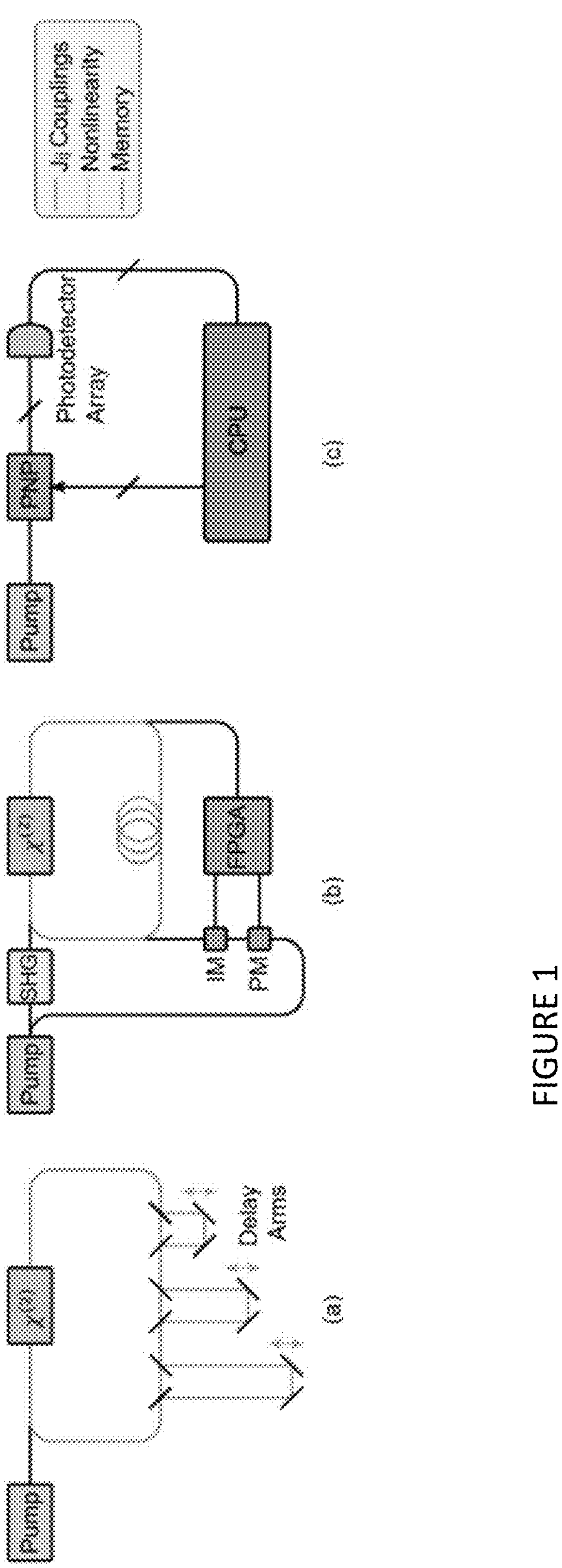
FIG. 1 Various CIM Architectures. (a) All-optical Ising machine with delay arms implementing the inter-pulse couplings.(b) Measurement-feedback Ising machine where the inter-pulse couplings are calculated by an FPGA and re-injected into the cavity. (c) Ising machine where the unitary operations are performed on a programmable nanophotonic waveguide mesh. In this case the nonlinearity can be performed optically, in the electro-optic conversion, or in the electric domain. PPLN: peri-odically poled lithium niobate, SHG: second harmonic generation, FPGA: field programmable gate array, PNP: programmable nanophotonic processor, IM/PM: intensity/phase modulator.
Figure 2:
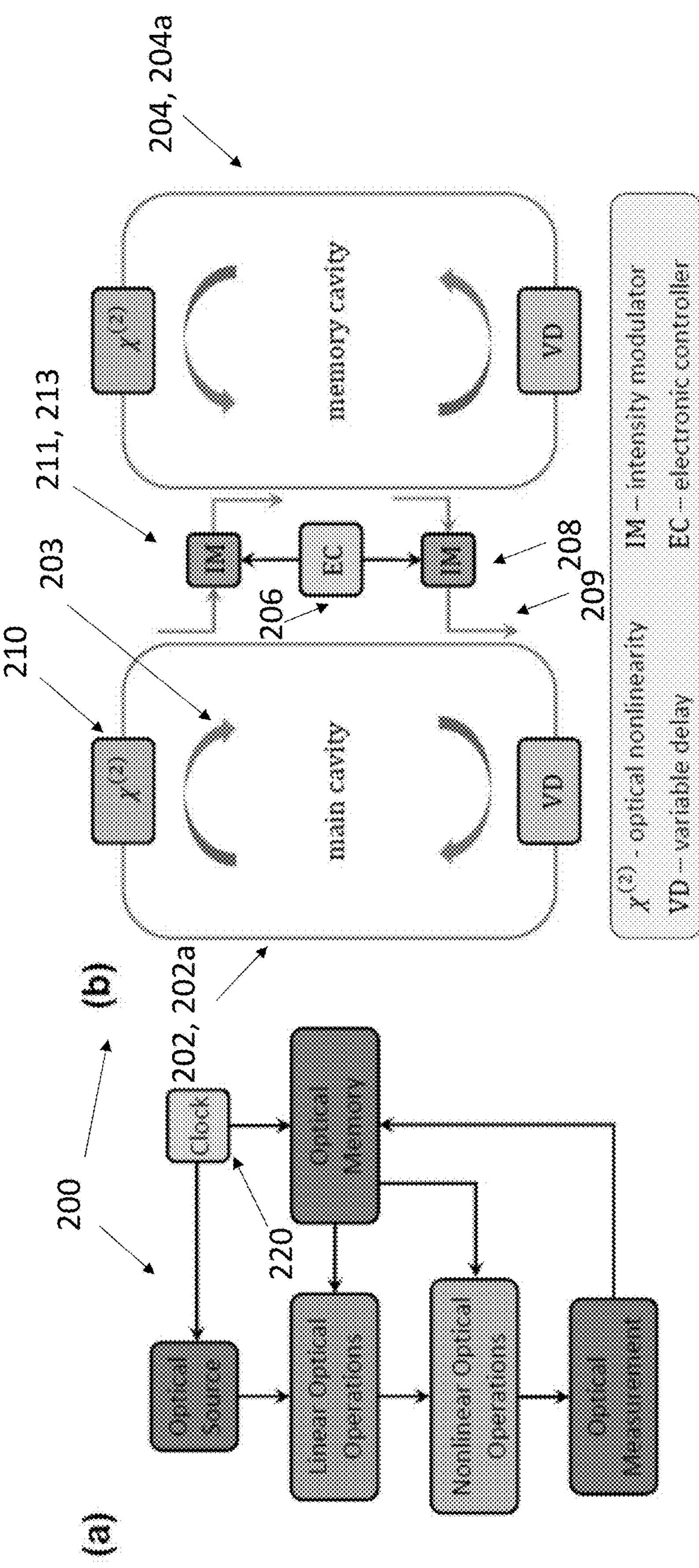
FIG. 2 Scalable and flexible time-multiplexed photonic computing architecture showing (a) flow of information and types of optical operations, and (b) high-level diagram of physical system composed of two optical resonators with controllable coupling between the cavities.

FIG. 2(*a*) illustrates a photonic computer system comprising an optical source producing coherent light pulses at a fixed repetition rate, a processor comprising a nonlinear material wherein (1) the light pulses can interact through time-multiplexing to perform arbitrary linear optical operations or (2) nonlinear operations can be performed using the nonlinear properties of the nonlinear material. The system further comprises an optical memory allowing for flexible scheduling and feedback of linear/nonlinear operations. The combination of both linear and nonlinear optical operations is necessary for more general computational applications described in subsequent sections. All computational operations, including linear and nonlinear functions, are implemented directly in the optical domain with electronics only used for controlling and handling input/output data. Outputs are read through optical measurement such as an additional interferometer or homodyne photodetection.

A high-level diagram of the proposed physical system is shown in FIG. 2(*b*) and is comprised of two coupled optical resonators. The first cavity executing the computations (henceforth referred to as the main cavity) comprises a synchronously pumped OPO consisting of a nonlinear $\chi^{(2)}$ optical material. The variable delay length of the main cavity is chosen such that it can be synchronously pumped with pulses and there are N equally spaced signal pulses in the cavity.

The action of the $\chi^{(2)}$ material during each round-trip depends upon the energy of the pump pulses. At low pump pulse energy, the nonlinear material can act in the depleted pump regime where the signal and pump pulse energies are comparable. This can be interpreted as performing a nonlinear activation function upon the signal pulse amplitude (Li et al., 2022b). At high pump pulse energy, the nonlinear material operates in the undepleted pump regime and acts only to compensate the linear round-trip signal loss of the main cavity. The pump pulses are modulated to ensure the correct operation according to the computation schedule.

The second cavity, henceforth referred to as the memory cavity, is used to store pulses from the main cavity. Its design is similar to the main cavity, except that it has an optical path length (including the appropriate optical path lengths from the coupler regions) of N+1 equally spaced signal pulses. The $\chi^{(2)}$ material in the memory cavity operates in the undepleted pump regime and acts only to compensate the linear round-trip signal loss of the memory cavity and is not used to perform nonlinear activations. The memory cavity can also contain an additional intensity modulator that is used to actively destroy pulses to clear the memory cavity.

The main and memory cavities are connected by tunable couplers that allow signal pulses to be stored from and reinjected into the main cavity, respectively. The couplers contain intensity modulators that are updated in real-time (i.e. on the time scale of the pulse repetition rate) to control the timing and proportion of the signal pulses being stored and reinjected.

Optical measurements can be performed by tapping off pulses from the main cavity. In the following sections, we provide more explicit details on how to construct the architecture in different photonic platforms.

b. Implementation Using Photonic Integrated Circuits

Figure 3:
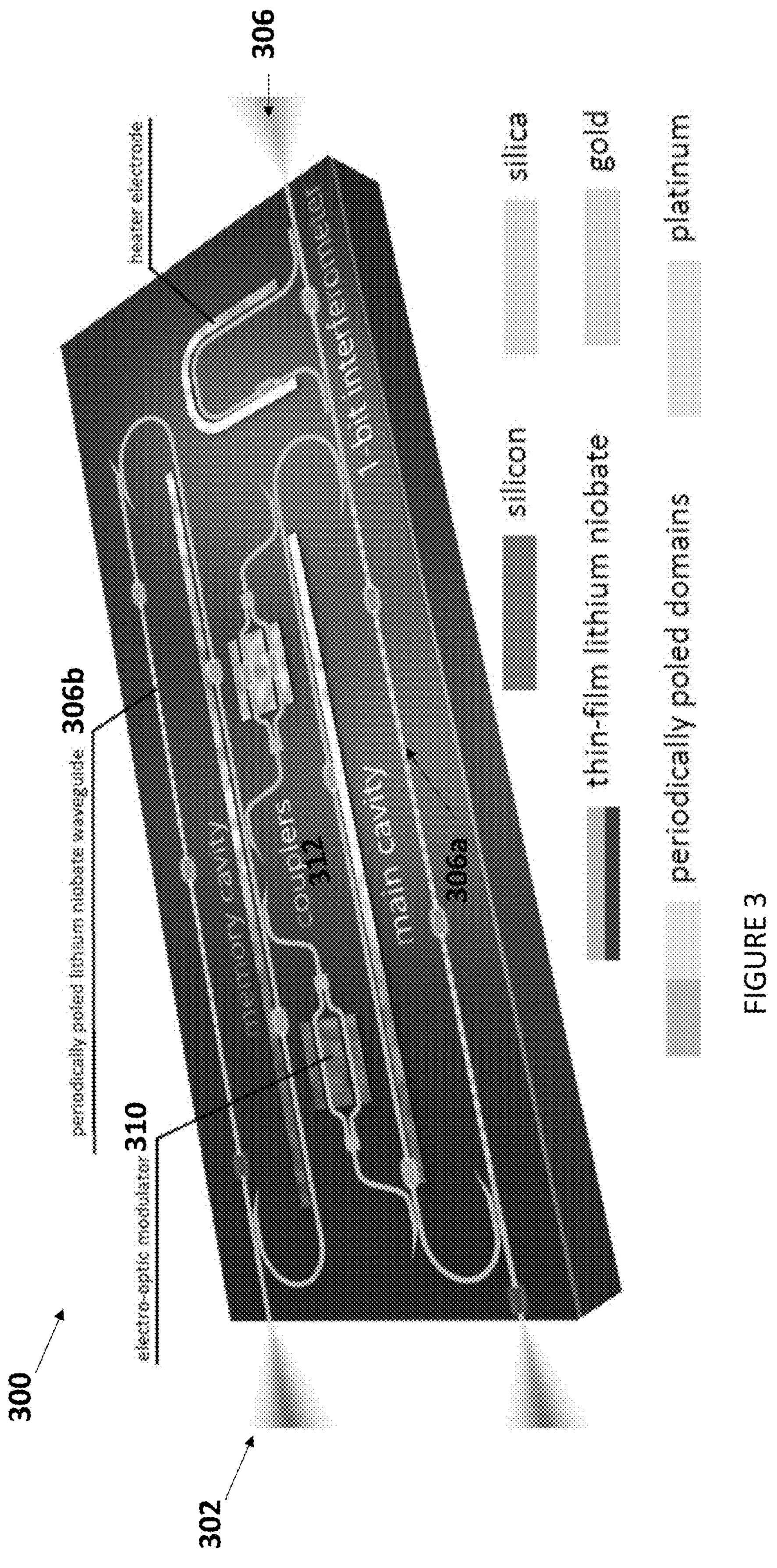
FIG. 3 Simplified schematic of all-optical and scalable CIM monolithically integrated on TFLN photonic chip.

FIG. 3 illustrates an embodiment architecture implemented using photonic integrated circuits. Unlike other table-top and optical fiber based CIMS (Honjo et al. 2021; Inagaki et al. 2016a1 b; Marandi et al. 2014 McMahon et al. 2016, Takata et al., 2016), the system described in this embodiment is based on TFLN nanophotonic waveguides (Zhu et al. 2021) and has two coupled cavities (Okawachi et al., 2020). The main cavity is a synchronously pumped OPO consisting of a periodically poled lithium niobate (PPLN) nanophotonic waveguide and a racetrack resonator (with optional spiral delays).

The couplers between the PPLN and racetrack resonator are designed such that the OPO is singly resonant—where only the signal pulse (represented by green pulses in FIG. 3) resonates and the pump pulses (represented by purple pulses in FIG. 3) only experience a single pass through the PPLN.

The main cavity contains a platinum heater electrode that can be used to tune the optical path length of the cavity through thermo-optic effects, which ensures that the main cavity resonance conditions are met. The PPLN is dispersion-engineered such that the group-velocity mismatch between signal and pump pulses' center frequencies and group-velocity dispersion is minimized (Ledezma et al. 2022 b). This ensures good temporal overlap of the pump and signal pulses and enhances the $\chi^{(2)}$ nonlinear optical interaction. The memory cavity design is similar to the main cavity, except that it has an optical path length (including the appropriate optical path lengths from the coupler regions) of N+1 equally spaced signal pulses. The intensity modulators in the tunable couplers can be implemented as electro-optic modulators (as shown in FIG. 3), which can operate at clock rates up to ~100 GHz (Wang et al. 2018), or as all-optical switches, which can operate at clock rates >10 THz (Guo et al. 2022).

A 1-bit interferometer can be integrated after the main cavity to measure the relative phases between the signal pulses. The 1-bit interferometer consists of two delay paths that are coherently recombined, with the longer path having an optical path length of 1 pulse repetition rate longer than the shorter path. A platinum heater electrode is used to tune the relative delays between the two paths. This allows the relative phases of the signal pulses to be determined. Alternatively, a fully coherent off-chip photodetection can be performed using homodyne detection with a local oscillator at the fundamental harmonic frequency, which also determines the phase information of the signal pulses. The short pump pulses (Yu et al., 2022) for the PPLNs and the local oscillator pulses (Ledezma et al. 2022a) for measurement can be generated off-chip or also monolithically integrated on TFLN.

Figure 4:
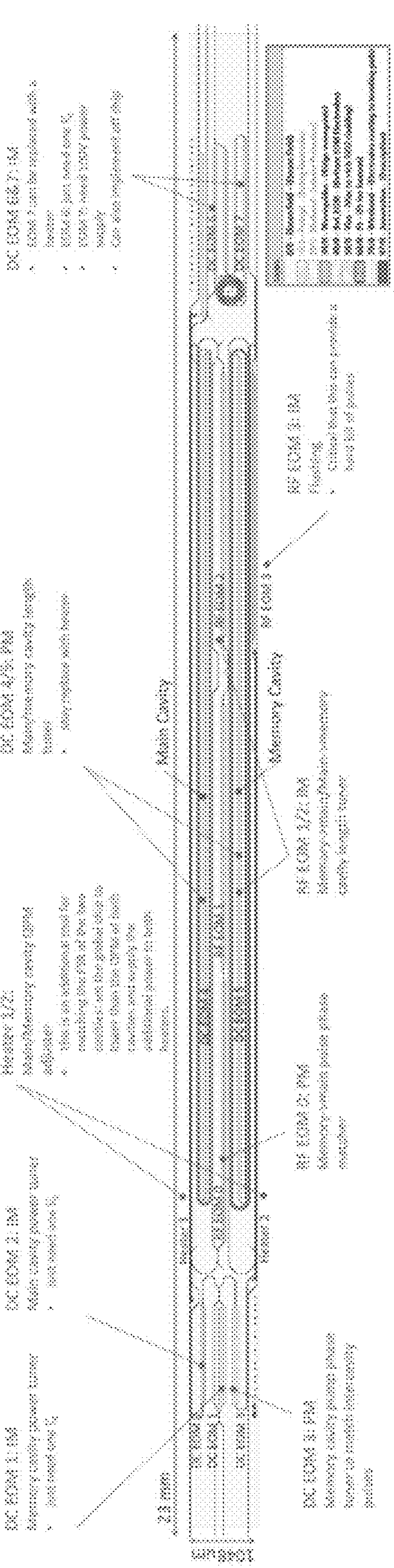
FIG. 4 Detailed schematic of all-optical CIM for problem size N=4 operating at clock rate of ~10 GHz and monolithically integrated on TFLN photonic chip.

FIG. 4 illustrates an embodiment of a more detailed TFLN photonic chip layout design implementing the proposed CIM architecture for N=4 problem size using electro-optic modulators (EOMs). The problem size N can be extended by using longer on-chip delay lines in the main and memory cavities. The chip is fabricated with different layers. The first layer is the TFLN (~700 nm thick LN) containing the etched ridge waveguides (~350 nm etch depth) and quasi-phase matched (QPM) regions with the poling electrodes removed (Ledezma et al. 2022 b). The gold electrodes for the EOMs are deposited after the waveguides are etched. Next, a layer of silica (~1 μm) is deposited using plasma-enhanced chemical vapor deposition to form a cladding layer with vias to the electrodes. Finally, routing electrodes and contact pads are deposited for wire-bonding or electrical probes to control the EOMs. The EOMs can be used as a phase modulator (PM) or as an intensity modulator (IM) if used in a Mach-Zehnder configuration and occur in two varieties: (1) direct current (DC) implementing a static phase shift or linear loss, and (2) radio frequency (RF) implementing real-time updates of coupling weights. The DC EOM 1 and DC EOM 2 are IMs used to control the relative pump powers entering the main and memory cavities, respectively. In this case, a single pump laser input port is used, but separate pump laser input ports can also be used. The DC EOM 3 is used to tune the relative phase between the main and memory cavities to provide additional tunability to match the relative optical path lengths of the main and memory cavities. The DC EOM 4 and DC EOM 5 are used to tune the optical path lengths in the main and memory cavities, respectively. These ensure the correct resonance and synchronous pumping conditions are met, but can also be replaced by platinum heater electrodes for greater tunability. The DC EOM 6 and DC EOM 7 control the relative path lengths in the 1-bit interferometer to ensure the desired phase readout measurement. RF EOM 0 and RF EOM 1 control the real-time phase and intensity of signal pulses being reinjected from the memory cavity to the main cavity. RF EOM 2 controls the real-time intensity of signal pulses entering the memory cavity from the main cavity. RF EOM 3 is used as a switch to clear pulses from the memory cavity. Heater 1 and heater 2 are used to thermo-optically tune the QPM regions to ensure efficient $\chi^{(2)}$ nonlinear optical interactions. The main and memory cavities are designed to operate at a clock rate of ~10 GHz, but can be extended up to the EOM bandwidth limit of ~100 GHz.

Figure 5:
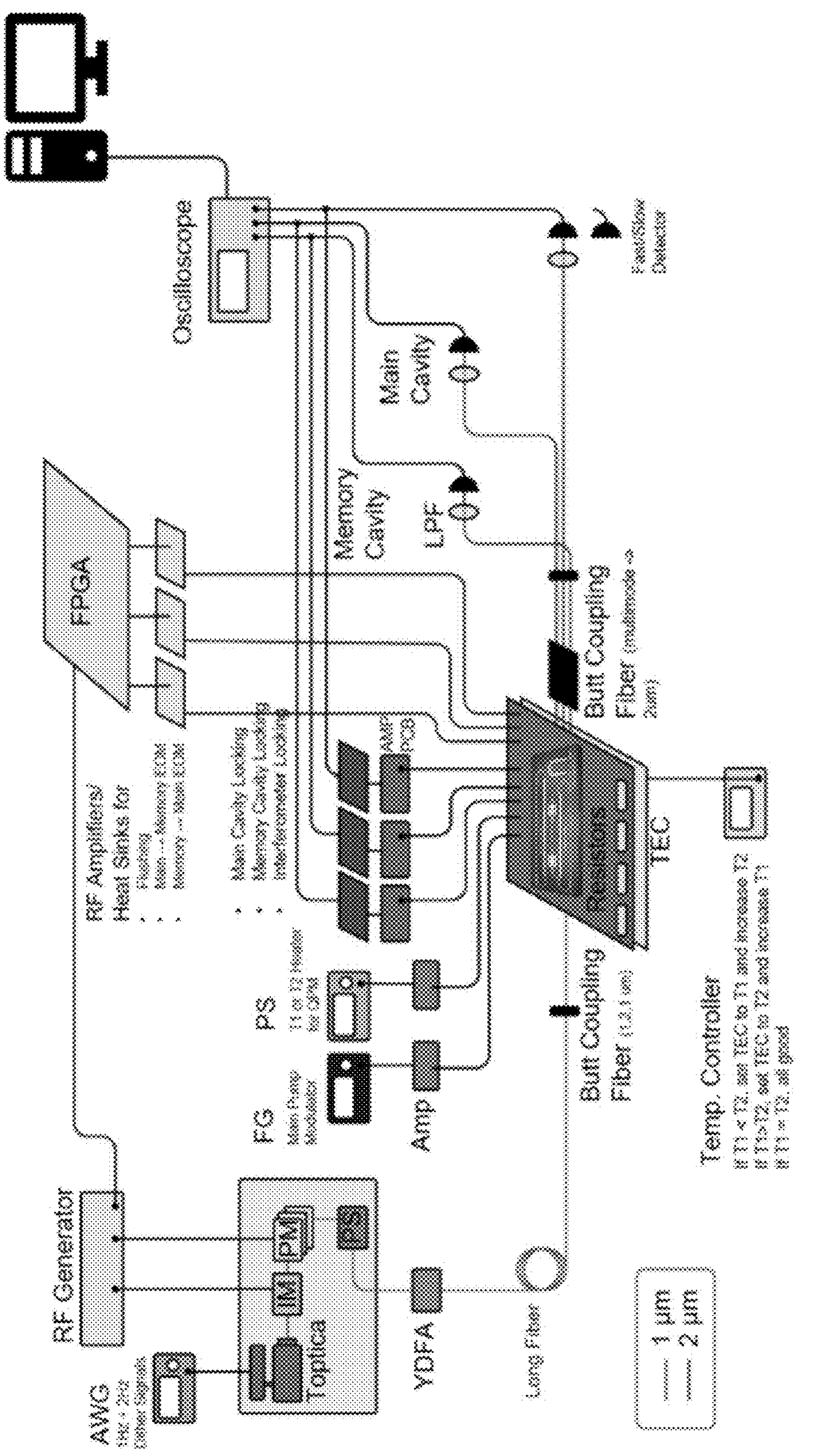
FIG. 5 Schematic of control electronics and measurement apparatus for all-optical CIM on TFLN photonic chip.

FIG. 5 is a schematic of the off-chip experimental setup with control electronics and measurement apparatus. The DC and RF EOMs require different control electronics. The system is designed to operate using a pump center wavelength of ~1 μm. A pump laser pulse train with —10 GHz can be constructed using an electro-optic comb (Metcalf et al., 2019) driven by an RF generator, and amplified using a Ytterbium-doped fiber amplifier (YDFA) to reach the desired pump pulse energy. The RF signals needed to control the RF EOMs are generated using a field-programmable gate array (FPGA) with RF system-on-chip and RF amplifiers. The DC EOMs and heaters controlling optical path lengths are driven using DC power supply with active locking using PIDs to ensure stable operation. The TFLN photonic chip is mounted on a thermo-electric cooler (TEC) stage with temperature controller to provide temperature stability. Optical input to the chip is accomplished using a single-mode lensed tip fiber (optionally with active alignment) and optical output to off-chip photodetector is done using a butt-coupled multimode fiber. A high-speed oscilloscope can be used to monitor the real-time signal pulses being measured.

c. Implementation Using Optical Fiber Components

Figure 6:
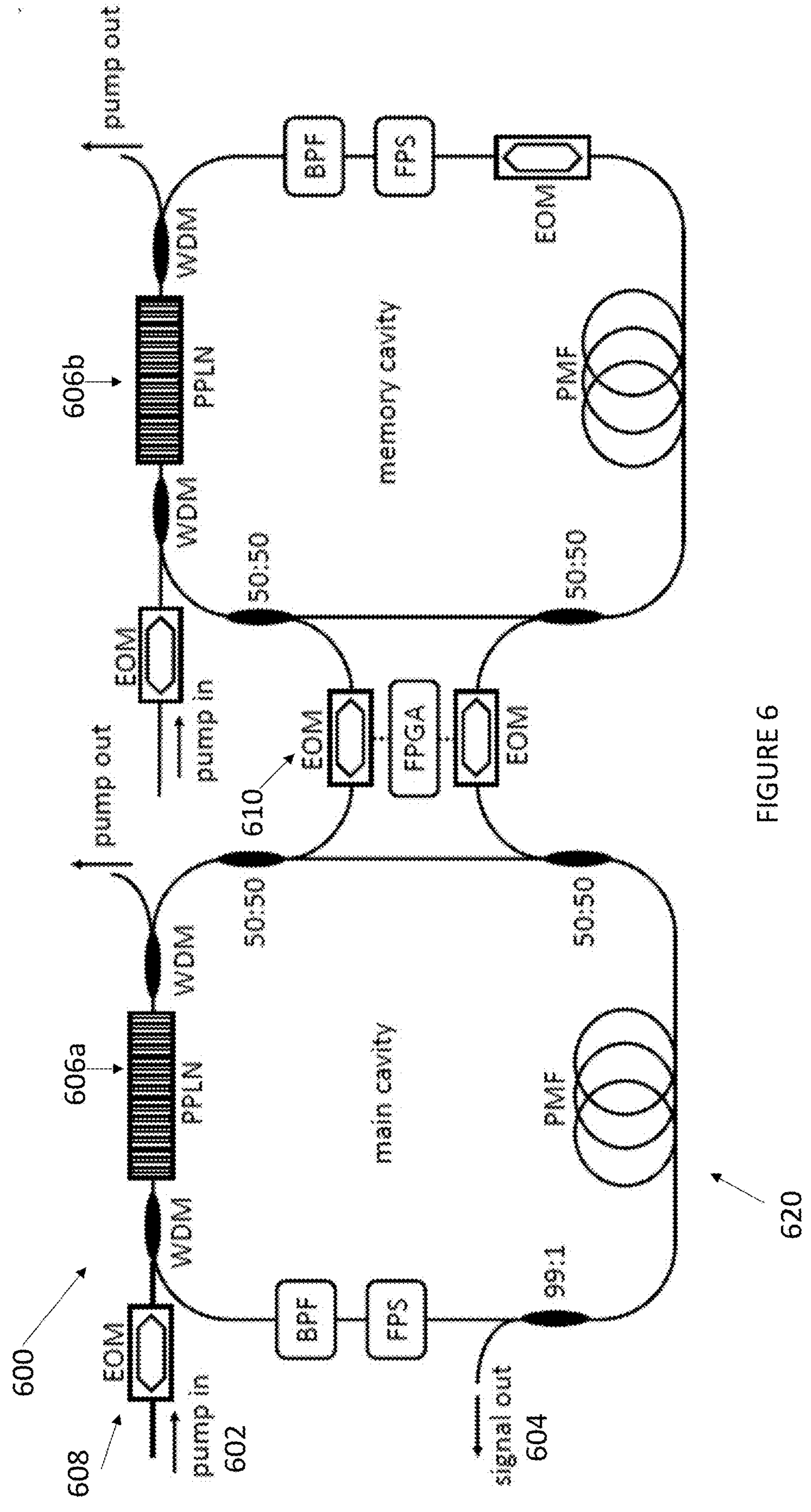
FIG. 6 Schematic of optical fiber-based design for time-multiplexed photonic computer. PPLN=periodically poled lithium niobate, WDM=wavelength division multiplexer, BPF=band-pass filter, FPS=fiber phase shifter, EOM=electro-optic modulator, PMF=polarization-maintaining fiber, FPGA=field-programmable gate array.

The time-multiplexed photonic computing architecture can also be implemented using mostly off-the shelf optical fiber components, which can be more convenient than the fully custom designs required for photonic integrated circuits during prototyping or early-stage demonstrations, especially for implementing long cavity lengths required for large N. FIG. 6 illustrates an embodiment optical fiber-based design.

In one or more embodiments, the cavities each contain polarization-maintaining fiber (PMF) designed for operation wavelength of 1550 nm, a fiber phase shifter (FPS) to stabilize the cavity length and lock phase, and a band-pass filter (BPF) to preserve pulse shapes after amplification. The PPLN is a fiber-coupled reverse-proton-exchanged weakly-guiding lithium niobate waveguide (Langrock and Fejer, 2007). A wavelength-division multiplexer (WDM) is used to inject and reject the pump pulses for each PPLN. The PPLN in the memory cavity can optionally be replaced by an erbium-doped fiber amplifier operating in the linear gain regime, although this may introduce additional amplified spontaneous emission compared to the roughly noiseless amplification characteristics from PPLNs. The EOMs are also commercially available fiber-coupled devices commonly used for telecommunications applications. The clock rate is limited to ~10 GHz due to the smaller bandwidth of the EOMs and narrow phase-matching bandwidth of the PPLN. The RF signals driving the EOMs are generated by an FPGA. The output signal can be measured using balanced homodyne detectors.

d. Implementation Using Free Space Optics

FIG. 6 illustrates an embodiment time-multiplexed photonic computer architecture implemented using freespace optics. However, this kind of platform has much lower performance and convenience compared to photonic integrated circuits or optical fiber-based platforms. In this embodiment, the free space cavities are constructed using a series of mirrors and collimators. Cavity stabilization can be performed using a Pound-Drever-Hall locking scheme with piezoelectric actuators (Black, 2001). The $\chi^{(2)}$ optical nonlinearity can be accomplished using bulk nonlinear crystals such as lithium niobate or potassium titanyl phosphate. The WDM is performed using dichroic mirrors able to distinguish between the signal and pump wavelengths used, and the couplers are free-space beamsplitters. Modulation of input pump signals and tunable couplers can be implemented using free-space electro-optic or acousto-optic modulators, which limits the overall clock rate of the free-space system to ~250 MHz.

e. Application to Combinatorial Optimization

The time-multiplexed photonic computing architecture can be programmed to implement a coherent Ising machine for combinatorial optimization problems. The computation schedule determines the real-time updates for the pump modulation and couplers between the main and memory cavities to ensure that the system correctly reaches the desired Ising problem solution. The computation occurs in two stages. The first stage enables all-to-all coupling of pulses in the main cavity, representing interactions in the Ising Hamiltonian defined by coupling strengths $J_{ij}$. In this stage, the signal pulses in the memory cavity to be reinjected are iteratively constructed by sequentially storing signal pulses with appropriate coupling strength $J_{ij}$ from the main cavity. Due to the difference of 1 pulse repetition rate between the optical path lengths in the main and memory cavities, the desired all-to-all couplings can be achieved after N round trips of the main cavity. During each round-trip in the main and memory cavities, the PPLNs act to compensate the linear round-trip loss. The second stage consists of a single round-trip in which the main cavity pump is modulated such that signal pulses in the main cavity experience nonlinear activation function from the PPLN. Simultaneously, the pulses in the memory cavity storing the pulse interactions are reinjected into the main cavity such that they constructively interfere with the appropriate signal pulse. Finally, any remaining pulses in the memory cavity are deleted. This two-stage process is repeated until the system reaches steady-state, which indicates that it has reached the desired Ising problem solution.

Figure 7:
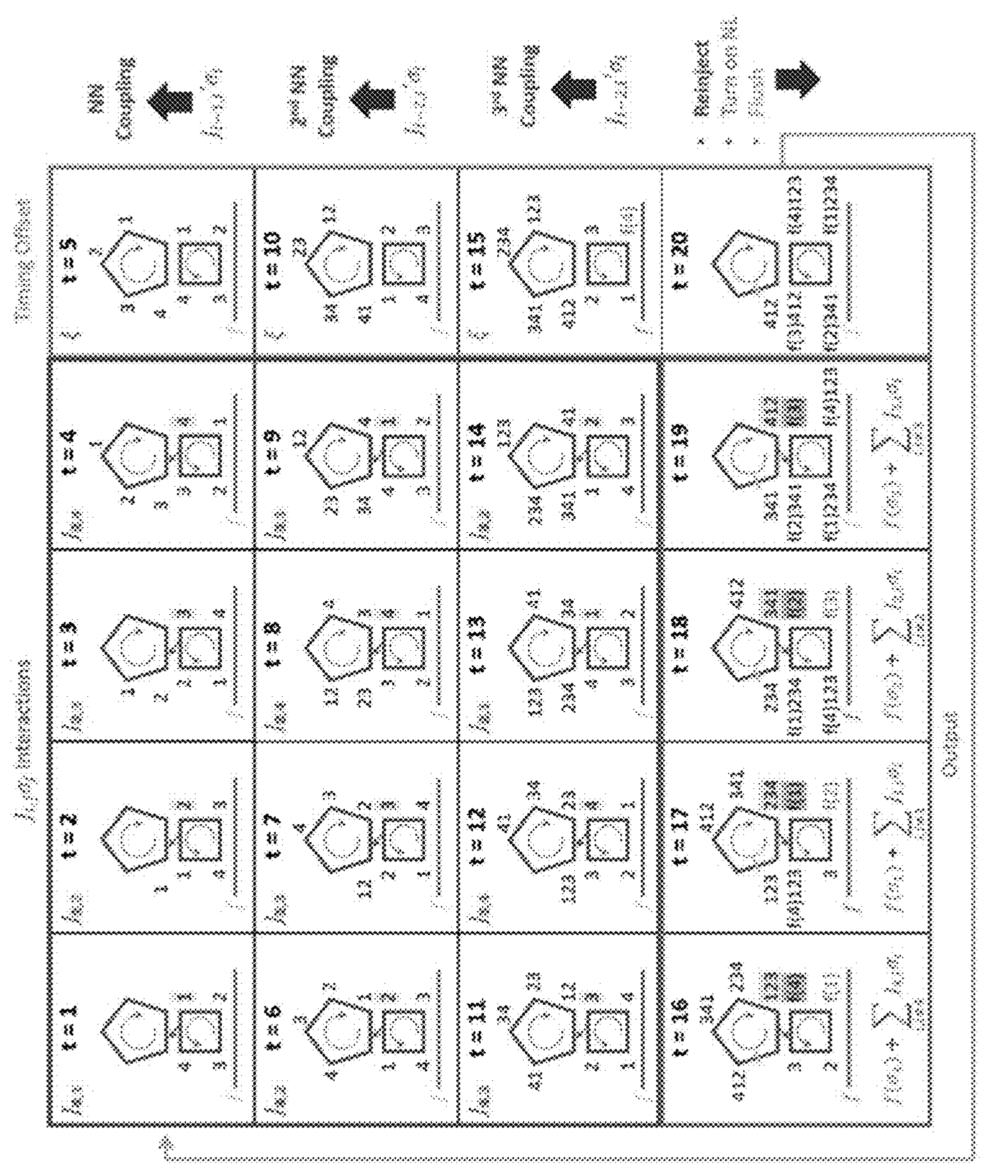
FIG. 7 Example computation schedule for an all-optical CIM with N=4 pulses in the main cavity. NN: nearest neighbor.

A symbolic representation of an embodiment computation schedule for N=4 is shown in FIG. 7. This procedure enables the architecture to scale to arbitrary problem size N with neither the need for N−1 delay lines nor multiple FPGAs for optoelectronic measurement feedback. The initial condition for the signal pulses can be taken to be vacuum fluctuations, or the main cavity can be seeded with initial signal pulses. Note that the computation occurs entirely in the optical domain, and is not limited by the electronics. The coupling weights $J_{i,j}$ controlling the coupling between main and memory cavities are known apriori and are cycled periodically. Therefore, even if EOMs are used to control couplings, the appropriate electronic control signals can theoretically be prepared beforehand and does not limit the optical computation speed. The CIM operation can be mathematically described by the discrete-time dynamical system shown in Eq. 2

$$x(t+1) = g \cdot f(x(t)) - \epsilon \cdot Jx(t) \tag{2}$$

where t is the discrete time, $f(\cdot)$ is an element-wise nonlinear function given by the travelling-wave $\chi^{(2)}$ interaction in the main cavity PPLN, x represents the vector of spin states, g is a gain scaling parameter, ε is an input coupling parameter, and J is the coupling matrix encoding the particular optimization problem to be solved.

f. Application to Reservoir Computing

Reservoir computing has emerged as a powerful new paradigm for temporal information processing (Lukoševičius and Jaeger, 2009). A reservoir computer consists of a reservoir and input/output layers. The reservoir consists of a network of dynamical nodes with randomly chosen connection weights, which generates complicated dynamics in response to input signals. The connections between the input layer and reservoir are also typically random. Only the output layer has variable connection weights, which are trained in a supervised manner. This greatly simplifies the training procedure since the input and reservoir weights are fixed. Since the output layer is most commonly a linear readout layer, simple methods such as least-squares regression can be used to train the weights (Huang et al. 2011). We focus on the echo-state network (ESN) approach, which is a type of random recurrent neural network and the most well-studied type of reservoir computer (Jaeger, 2002). The ESN is described by the discrete-time dynamical system in Eq. 3

$$x(t+1) = f\left(W^r \cdot x(t) + W^i \cdot u(t)\right)$$

where t is the discrete time, $f(\cdot)$ is an element-wise nonlinear function, x is a vector of reservoir states, $W^r$ is the reservoir weight matrix, $W^i$ is the input weight matrix, and u are the inputs. Outputs y are obtained using a linear readout layer as shown in Eq. 4

$$y(t) = W^o \cdot x(t)$$

where $W^o$ is the output weight matrix. The random weights are commonly sampled from uniform or normal distributions, and the reservoir weights are scaled such that the ESN possesses the so-called echo-state property or common-signal-induced synchronization (Inubushi and Yoshimura, 2017).

There has been great interest in using optics to make physical reservoir computers (Tanaka et al. 2019). Optics hardware allows for fast, low-energy, and sufficiently complicated reservoirs that are difficult to efficiently emulate on conventional electronic computers. Many different optical reservoir computers have achieved state-of-the-art performance on time-series prediction and classification benchmarks (Brunner et al., 2019, Van der Sande et al. 2017). Our time-multiplexed optical computing scheme can efficiently implement an ESN. Eqs. 3 and 4 can be straightforwardly decomposed into sequential linear and nonlinear activation operations. We note that time-multiplexed optical ESNs based on a single time-delayed nonlinear node have been previously demonstrated (Brunner et al. 2013 Duport et al., 2012, 2016, Larger et al. 2017; Ortín et al., 2015).

However, our architecture has several key differences and advantages: (1) We have precise control of all reservoir weights and can achieve arbitrary all-to-all connections, whereas previous optical ESNs have very limited or no control of reservoir weights. This allows us greater variety and better fine-tuning of reservoir properties. (2) We can selectively turn on/off the nonlinearity for particular reservoir nodes since the linear and nonlinear operations in our setup are decoupled. This has been shown to be beneficial for ESN performance (Inubushi and Yoshimura, 2017). (3) The $\chi^{(2)}$ optical nonlinearity can be tuned to yield a variety of nonlinear activation functions (Li et al. 2022 b) which were not used in previous optical reservoirs. In addition, it is also possible to directly utilize the nonlinear non-equilibrium dynamics of coupled OPOs as a complex physical reservoir layer without implementing the ESN model of Eq. 3. In one or more embodiments, our nonlinearity given by second-harmonic generation in the PPLN is of the form $f(x)=x \cdot \sec h(x)$, which was not used in previous optical reservoirs.

g. Application to Deep Learning

Deep neural networks are one of the most important types of machine learning and have revolutionized many applications such as image recognition and natural language processing (LeCun et al. 2 2015). They are a type of directed graph consisting of an input layer, multiple hidden layers, and an output layer with each node performing a nonlinear activation. Layers can either be connected in a feed-forward topology or have recurrent connections. The connection weights are most commonly trained in a supervised manner using backpropagation. We focus on a powerful type of neural network called a multi-layer perceptron (MLP), which consists of feed-forward fully-connected layers. Its operation is described by Eq. 5

$$x^{(l)} = f\left(W^{(l)} \cdot x^{(l-1)}\right)$$

where $x^{(l)}$ are the activations of the $l^{th}$ layer, $f(\cdot)$ is the element-wise nonlinear activation function, and $W^{(l)}$ are the connection weights to the $l^{th}$ layer.

Their success and ubiquity in recent years can be largely attributed to rapid increases in computing power and data availability. Deep learning models have grown at such an astonishing pace that they have necessitated the use of hardware accelerators such as graphics processing units and other electronic application-specific integrated circuits (Schuman et al. 2017). Consequently, developments in optical neural networks (ONNs) have experienced a major resurgence in recent years to meet the exploding demand for deep learning (Nahmias et al. 2019, Prucnal and Shastri 2017). Analogue and non-von Neumann ONNs are a promising candidate for low-precision machine learning because of their potential for ultrafast, low-power and parallel processing. Both integrated photonics (Feldmann et al. 2019, 2020, Ríos et al., 2019; Shen et al., 2017; Tait et al., 2017, Xu et al., 2021) and free-space optics platforms (Bernstein et al., 2020; Guo et al., 2019; Hamerly et al., 2019a Lin et al., 2018; Miscuglio et al., 2020; Zuo et al. 2019) have been studied, which exploit a variety of techniques including time, wavelength, and spatial multiplexing. Our time-multiplexed setup provides a very natural implementation of the MLP in Eq. 5 by performing the linear operations and nonlinear activations layer-wise. The setup can also be straightforwardly programmed to implement other popular types of deep neural networks, such as convolutional neural networks.

Our setup has several key differences and advantages compared to previous ONNs for deep learning: (1) We can easily implement both positive and negative values since we can modulate light pulse phases and use coherent detection. This important feature is absent in almost all previous ONNs because they use incoherent detection and cannot easily maintain phase stability over many spatially-multiplexed elements. (2) Our ONN performs all computations (linear operations and nonlinear activations) in the optical domain, with electronics only used for control and data handling purposes, whereas other ONNs often perform part of the computation in the electrical domain, such as summation via charge accumulation on the photodetector. (3) Our all-optical nonlinearity from the PPLN is ultrafast with femtosecond response times, whereas most ONNs apply the nonlinearity electronically. Furthermore, the types of nonlinear activations implemented by $\chi^{(2)}$ nonlinear photonics are those most commonly used for deep learning such as the Rectified Linear Unit (Li et al. 2022 b). Some all-optical ONNs use slower optical nonlinearities such as saturable absorption. (4) There is a minimal number of physical neurons and overhead required for our time-multiplexed scheme since the same physical neuron is effectively reused. This is in stark contrast to most ONNs, which use spatial multiplexing and have large overheads. Moreover, they require significant preprocessing of data since the fixed number of spatial channels does not directly suit all neural network architectures. (5) Our simple choice of electro-optic modulators allows us to seamlessly update weights on-the-fly as required by the neural network, hence allowing us to perform both inference and training. Almost all previous ONNs are restricted to only inference since their weights are assumed to be quiescent or only change infrequently. They often cannot be easily changed due to requiring complicated calibration procedures including calculating singular value decompositions for matrix multiplication (Shen et al. 2017) and/or slow fine-tuning of many imperfect spatially multiplexed components (Miller, 2015). This greatly reduces their available functionality for deep learning. Hence, our proposed time-multiplexed photonic computing architecture can potentially function as a truly standalone end-to-end ONN.

h. Application to Cellular Automata

Cellular Automata (CA) are a class of computational models composed of a lattice of cells with states that update according to local rules. Even very simple rules can lead to unexpected emergent phenomena such as fractals, chaos, and self-organized patterns (Wolfram, 1983). Consequently, CA have been used as models of complexity (Wolfram, 1984) and are even capable of universal computation (Cook et al. 2004, Rendell, 2002). CA perform unconventional computing based on decentralized and local dynamical information, which is in contrast to the centralized and global memory in modern von Neumann computers. The simplest class of CA are Elementary Cellular Automata (ECA), which are discrete-time dynamical systems defined on a 1D lattice with local cell update rule defined by Eq. 6

$$x_i(t+1) = f(x_{i-1}(t), x_i(t), x_{i+1}(t)),$$

where $x_i(t) \in \mathbb{Z}_2$ is the $i^{th}$ cell with binary states at time step t, and $$f: \mathbb{Z}_2^3 \to \mathbb{Z}_2$$

is the state transition function.

An implementation of ECA based on time-multiplexed nearest-neighbour linear optical couplings and optoelectronic thresholding was recently demonstrated (Li et al. 2022 a) since the local sparse connections are naturally suited for time-multiplexed photonic systems. The time-multiplexed photonic computing architecture described herein can generalize previous photonic CA results by enabling different local neighbourhoods beyond just nearest-neighbours and also higher dimensional lattices beyond 1D. The binary states can be enforced all-optically using the $\chi^{(2)}$ optical nonlinearity (Guo et al. 2022) instead of optoelectronically. Furthermore, CA have been extended to continuous-variable and fully differentiable models known as Neural Cellular Automata (NCA) Mordvintsev et al. 2020; Randazzo et al. 2020 to be compatible with modern deep learning techniques that learn local update rules to perform a specific task by using neural networks. This forms a more parameter-efficient and robust approach to neuromorphic computing compared to existing deep neural networks such as MLPs with dense fully-connected layers. Our photonic computing architecture can be used to encode the rules for NCA trained to perform tasks such as self-organized pattern formation and image classification. In this case, the nonlinear activation function used can be more general and continuous-valued as opposed to the discrete state transition functions required by conventional CA.

i. Scaling to Terahertz Clock Rates

The all-optical computation enables potentially >10 THz clock rates, which is more than 3 orders of magnitude faster than previous optoelectronic computers limited by digital electronics such as FPGAs. New methods for high-speed modulation and measurement of short light pulses are needed to fully exploit the optical bandwidth. This can be accomplished by using time-multiplexed input generation and output measurement, which can also be monolithically integrated onto TFLN platform. To enable real-time modulation beyond the electro-optic bandwidth of ~100 GHz, the RF EOMs controlling the couplers in FIG. 3 and FIG. 4 can be replaced by all-optical switches. For example, an all-optical switch can be made of cascaded PPLNs with a directional coupler, which has been shown to operate with a bandwidth >10 THz (Guo et al. 2022).

Figure 8:
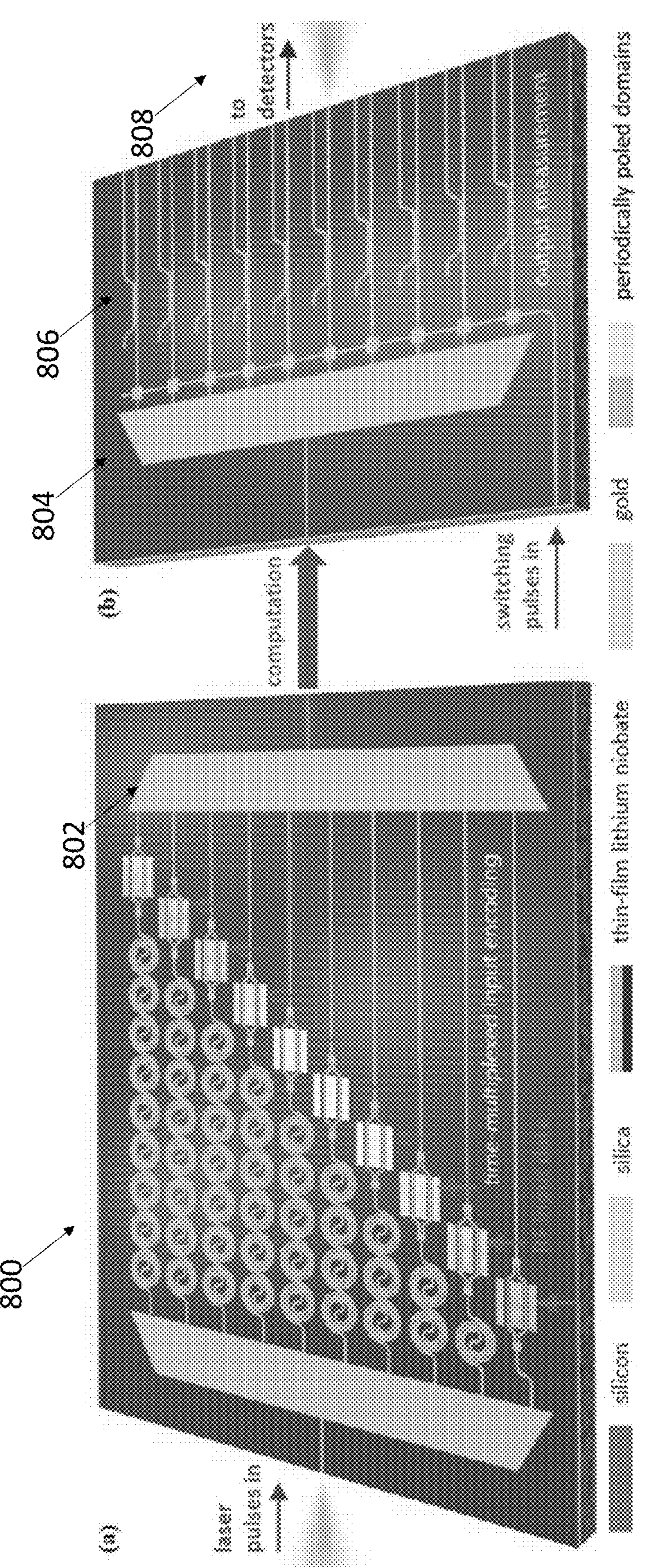
FIG. 8 (a) Input data encoding can be achieved by time-multiplexing sets of fast EOMs in each delay line to reconstruct the full optical bandwidth. (b) Similarly, output measurement can be accomplished using sets of all-optical switches to down-sample to clock rates amenable for photodetection.

The optical control pulses for these all-optical switches can be generated using time-multiplexing as shown in FIG. 8(*a*). To encode input data at a terahertz clock rate for a single channel, the input laser pulses with a 100 GHz repetition rate are split into 10 sets of delay lines each containing a 100 GHz EOM. Therefore, each delay line will be responsible for encoding the input data for every $10^{th}$ pulse in the 1 THz clock rate pulse train that results after recombining the delay lines. This time-multiplexed approach can be scaled up simply by increasing the number of delay lines. Once the desired input data is encoded onto a 1 THz pulse train, it can be sent to control the real-time modulators in the couplers for storing and reinjecting pulses between the main and memory cavities. Conversely, the measurement of terahertz clock rate pulses can utilize a set of all-optical switches to down-sample to lower clock rates amenable to photodetection as shown in FIG. 8(*b*). For example, a set of 10 all-optical switches can be used to split the output 1 THz pulse train from the main cavity or 1-bit interferometer into 10 sets of 100 GHz pulse trains that can be directly photodetected. The final signal can be reconstructed by recombining the detected values from each photodetector. Therefore, by utilizing time-multiplexed input generation and measurement, the all-optical computer is limited only by the phase-matching bandwidth of the PPLNs, which determines the minimum possible pulse length and maximum clock rate.

References For First Example

The following references are incorporated by reference herein.

Bernstein, Liane, Alexander Sludds, Ryan Hamerly, Vivienne Sze, Joel Emer, and Dirk Englund (2020), "Freely scalable and reconfigurable optical hardware for deep learning," arXiv preprint arXiv:2006.13926.

Black, Eric D (2001), "An introduction to pound-drever-hall laser frequency stabilization," American journal of physics 69 (1), 79-87.

Böhm, Fabian, Guy Verschaffelt, and Guy Van der Sande (2019), "A poor man's coherent ising machine based on opto-electronic feedback systems for solving optimization problems," Nature Communications 10 (1), 1-9.

Brunner, Daniel, Miguel C Soriano, Claudio R Mirasso, and Ingo Fischer (2013), "Parallel photonic information processing at gigabyte per second data rates using transient states," Nature communications 4 (1), 1-7.

Brunner, Daniel, Miguel C Soriano, and Guy Van der Sande (2019), "Photonic reservoir computing," De Gruyter 8, 19.

Cook, Matthew, et al. (2004), "Universality in elementary cellular automata," Complex systems 15 (1), 1-40.

De las Cuevas, Gemma, and Toby S Cubitt (2016), "Simple universal models capture all classical spin physics," Science 351 (6278), 1180-1183.

Duport, François, Bendix Schneider, Anteo Smerieri, Marc Haelterman, and Serge Massar (2012), "All-optical reservoir computing," Optics express 20 (20), 22783-22795.

Duport, François, Anteo Smerieri, Akram Akrout, Marc Haelterman, and Serge Massar (2016), "Fully analogue photonic reservoir computer," Scientific reports 6 (1), 1-12.

Feldmann, J, N Youngblood, C David Wright, H Bhaskaran, and W H P Pernice (2019), "All-optical spiking neurosynaptic networks with self-learning capabilities," Nature 569 (7755), 208-214.

Feldmann, Johannes, Nathan Youngblood, Maxim Karpov, Helge Gehring, Xuan Li, Manuel Le Gallo, Xin Fu, Anton Lukashchuk, Arslan Raja, Junqiu Liu, et al. (2020), "Parallel convolution processing using an integrated photonic tensor core," arXiv preprint arXiv:2002.00281.

Guo, Qiushi, Ryoto Sekine, Luis Ledezma, Rajveer Nehra, Devin J Dean, Arkadev Roy, Robert M Gray, Saman Jahani, and Alireza Marandi (2022), "Femtojoule femtosecond all-optical switching in lithium niobate nanophotonics," Nature Photonics 16(9), 668-668.

Guo, Xianxin, Thomas D Barrett, Zhiming M Wang, and A I Lvovsky (2019), "Backpropagation through nonlinear units for all-optical training of neural networks," arXiv preprint arXiv:1912.12256.

Hamerly, Ryan, Liane Bernstein, Alexander Sludds, Marin Soljačić, and Dirk Englund (2019a), "Large-scale optical neural networks based on photoelectric multiplication," Physical Review X 9 (2), 021032.

Hamerly, Ryan, Takahiro Inagaki, Peter L McMahon, Davide Venturelli, Alireza Marandi, Tatsuhiro Onodera, Edwin Ng, Carsten Langrock, Kensuke Inaba, Toshimori Honjo, et al. (2019b), "Experimental investigation of performance differences between coherent ising machines and a quantum annealer," Science Advances 5 (5), eaau0823.

Honjo, Toshimori, Tomohiro Sonobe, Kensuke Inaba, Takahiro Inagaki, Takuya Ikuta, Yasuhiro Yamada, Takushi Kazama, Koji Enbutsu, Takeshi Umeki, Ryoichi Kasahara, et al. (2021), "100,000-spin coherent ising machine," Science Advances 7 (40), eabh0952.

Huang, Guang-Bin, Dian Hui Wang, and Yuan Lan (2011), "Extreme learning machines: a survey," International journal of machine learning and cybernetics 2 (2), 107-122.

Inagaki, Takahiro, Yoshitaka Haribara, Koji Igarashi, Tomohiro Sonobe, Shuhei Tamate, Toshimori Honjo, Alireza Marandi, Peter L McMahon, Takeshi Umeki, Koji Enbutsu, et al. (2016a), "A coherent ising machine for 2000-node optimization problems," Science 354 (6312), 603-606.

Inagaki, Takahiro, Kensuke Inaba, Ryan Hamerly, Kyo Inoue, Yoshihisa Yamamoto, and Hiroki Takesue (2016b), "Large-scale ising spin network based on degenerate optical parametric oscillators," Nature Photonics 10 (6), 415-419.

Inubushi, Masanobu, and Kazuyuki Yoshimura (2017), "Reservoir computing beyond memory-nonlinearity trade-off," Scientific reports 7(1), 1-10.

Jaeger, Herbert (2002), "Short term memory in echo state networks. gmd-report 152," in GMD-German National Research Institute for Computer Science (2002), http://www.faculty.jacobs-university. de/hjaeger/pubs/STMEchoStatesTechRep. pdf (Citeseer).

Johnson, Mark W, Mohammad H S Amin, Suzanne Gildert, Trevor Lanting, Firas Hamze, Neil Dickson, Richard Harris, Andrew J Berkley, Jan Johansson, Paul Bunyk, et al. (2011), "Quantum annealing with manufactured spins," Nature 473 (7346), 194-198.

Karp, Richard M (1972), "Reducibility among combinatorial problems," in Complexity of computer computations (Springer) pp. 85-103.

Kim, Kihwan, M-S Chang, Simcha Korenblit, Rajibul Islam, Emily E Edwards, James K Freericks, G-D Lin, L-M Duan, and Christopher Monroe (2010), "Quantum simulation of frustrated ising spins with trapped ions," Nature 465 (7298), 590-593.

Langrock, Carsten, and M M Fejer (2007), "Fiber-feedback continuous-wave and synchronously-pumped singly-resonant ring optical parametric oscillators using reverse-proton-exchanged periodically-poled lithium niobate waveguides," Optics letters 32 (15), 2263-2265.

Larger, Laurent, Antonio Baylón-Fuentes, Romain Martinenghi, Vladimir S Udaltsov, Yanne K Chembo, and Maxime Jacquot (2017), "High-speed photonic reservoir computing using a time-delay-based architecture: Million words per second classification," Physical Review X 7 (1), 011015.

LeCun, Yann, Yoshua Bengio, and Geoffrey Hinton (2015), "Deep learning," nature 521 (7553), 436-444.

Ledezma, Luis, Arkadev Roy, Luis Costa, Ryoto Sekine, Robert Gray, Qiushi Guo, Ryan M Briggs, and Alireza Marandi (2022a), "Widely-tunable optical parametric oscillator in lithium niobate nanophotonics," arXiv preprint arXiv:2203.11482.

Ledezma, Luis, Ryoto Sekine, Qiushi Guo, Rajveer Nehra, Saman Jahani, and Alireza Marandi (2022b), "Intense optical parametric amplification in dispersion-engineered nanophotonic lithium niobate waveguides," Optica 9 (3), 303-308.

Leefmans, Christian, Avik Dutt, James Williams, Luqi Yuan, Midya Parto, Franco Nori, Shanhui Fan, and Alireza Marandi (2022a), "Topological dissipation in a time-multiplexed photonic resonator network," Nature Physics 18 (4), 442-449.

Leefmans, Christian, Midya Parto, James Williams, Gordon H Y Li, Avik Dutt, Franco Nori, and Alireza Marandi (2022b), "Topological temporally mode-locked laser," arXiv preprint arXiv:2209.00762.

Li, Gordon H Y, Christian R Leefmans, James Williams, and Alireza Marandi (2022a), "Photonic elementary cellular automata for simulation of complex phenomena," arXiv preprint arXiv:2211.01811.

Li, Gordon H Y, Ryoto Sekine, Rajveer Nehra, Robert M Gray, Luis Ledezma, Qiushi Guo, and Alireza Marandi (2022b), "All-optical ultrafast relu function for energy-efficient nanophotonic deep learning," Nanophotonics.

Lin, Xing, Yair Rivenson, Nezih T Yardimci, Muhammed Veli, Yi Luo, Mona Jarrahi, and Aydogan Ozcan (2018), "All-optical machine learning using diffractive deep neural networks," Science 361 (6406), 1004-1008.

Lucas, Andrew (2014), "Ising formulations of many np problems," Frontiers in Physics, 5.

Lukoševičius, Mantas, and Herbert Jaeger (2009), "Reservoir computing approaches to recurrent neural network training," Computer Science Review 3 (3), 127-149.

Marandi, Alireza, Zhe Wang, Kenta Takata, Robert L Byer, and Yoshihisa Yamamoto (2014), "Network of time-multiplexed optical parametric oscillators as a coherent ising machine," Nature Photonics 8 (12), 937-942.

McMahon, Peter L, Alireza Marandi, Yoshitaka Haribara, Ryan Hamerly, Carsten Langrock, Shuhei Tamate, Takahiro Inagaki, Hiroki Takesue, Shoko Utsunomiya, Kazuyuki Aihara, et al. (2016), "A fully programmable 100-spin coherent ising machine with all-to-all connections," Science 354 (6312), 614-617.

Metcalf, Andrew J, Connor D Fredrick, Ryan C Terrien, Scott B Papp, and Scott A Diddams (2019), "30 ghz electro-optic frequency comb spanning 300 thz in the near infrared and visible," Optics Letters 44 (11), 2673-2676.

Miller, David A B (2015), "Perfect optics with imperfect components," Optica 2 (8), 747-750.

Miscuglio, Mario, Zibo Hu, Shurui Li, Jonathan K George, Roberto Capanna, Hamed Dalir, Philippe M Bardet, Puneet Gupta, and Volker J Sorger (2020), "Massively parallel amplitude-only Fourier neural network," Optica 7 (12), 1812-1819.

Mordvintsev, Alexander, Ettore Randazzo, Eyvind Niklasson, and Michael Levin (2020), "Growing neural cellular automata," Distill 5 (2), e23.

Nahmias, Mitchell A, Thomas Ferreira De Lima, Alexander N Tait, Hsuan-Tung Peng, Bhavin J Shastri, and Paul R Prucnal (2019), "Photonic multiply-accumulate operations for neural networks," IEEE Journal of Selected Topics in Quantum Electronics 26 (1), 1-18.

Nasari, Hadiseh, Gisela Lopez-Galmiche, Helena E Lopez-Aviles, Alexander Schumer, Absar U Hassan, Qi Zhong, Stefan Rotter, Patrick LiKamWa, Demetrios N Christodoulides, and Mercedeh Khajavikhan (2022), "Observation of chiral state transfer without encircling an exceptional point," Nature 605 (7909), 256-261.

Okawachi, Yoshitomo, Mengjie Yu, Jae K Jang, Xingchen Ji, Yun Zhao, Bok Young Kim, Michal Lipson, and Alexander L Gaeta (2020), "Demonstration of chip-based coupled degenerate optical parametric oscillators for realizing a nanophotonic spin-glass," Nature Communications 11 (1), 1-7.

Ortín, S, Miguel C Soriano, L Pesquera, Daniel Brunner, D San-Martín, Ingo Fischer, C R Mirasso, and J M Gutiérrez (2015), "A unified framework for reservoir computing and extreme learning machines based on a single time-delayed neuron," Scientific reports 5(1), 1-11.

Pankov, Artem V, Ilya D Vatnik, and Andrey A Sukhorukov (2022), "Optical neural network based on synthetic nonlinear photonic lattices," Physical Review Applied 17 (2), 024011.

Parto, Midya, Christian Leefmans, James Williams, Franco Nori, and Alireza Marandi (2022), "Non-abelian effects in dissipative photonic topological lattices," arXiv preprint arXiv:2212.02598.

Peng, Bo, Shuo Yan, Dali Cheng, Danying Yu, Zhanwei Liu, Vladislav V Yakovlev, Luqi Yuan, and Xianfeng Chen (2021), "Novel optical neural network architecture with the temporal synthetic dimension," arXiv preprint arXiv:2101.08439.

Prabhu, Mihika, Charles Roques-Carmes, Yichen Shen, Nicholas Harris, Li Jing, Jacques Carolan, Ryan Hamerly, Tom BaehrJones, Michael Hochberg, Vladimir Čeperić, et al. (2020), "Accelerating recurrent ising machines in photonic integrated circuits," Optica 7 (5), 551-558.

Prucnal, Paul R, and Bhavin J Shastri (2017), Neuromorphic photonics (CRC Press).

Randazzo, Ettore, Alexander Mordvintsev, Eyvind Niklasson, Michael Levin, and Sam Greydanus (2020), "Self-classifying mnist digits," Distill 5 (8), e00027-002.

Rendell, Paul (2002), "Turing universality of the game of life," in Collision-based computing (Springer) pp. 513-539.

Ríos, Carlos, Nathan Youngblood, Zengguang Cheng, Manuel Le Gallo, Wolfram H P Pernice, C David Wright, Abu Sebastian, and Harish Bhaskaran (2019), "In-memory computing on a photonic platform," Science advances 5 (2), eaau5759.

Van der Sande, Guy, Daniel Brunner, and Miguel C Soriano (2017), "Advances in photonic reservoir computing," Nanophotonics 6(3), 561-576.

Schuman, Catherine D, Thomas E Potok, Robert M Patton, J Douglas Birdwell, Mark E Dean, Garrett S Rose, and James S Plank (2017), "A survey of neuromorphic computing and neural networks in hardware," arXiv preprint arXiv:1705.06963.

Shen, Yichen, Nicholas C Harris, Scott Skirlo, Mihika Prabhu, Tom Baehr-Jones, Michael Hochberg, Xin Sun, Shijie Zhao, Hugo Larochelle, Dirk Englund, et al. (2017), "Deep learning with coherent nanophotonic circuits," Nature Photonics 11 (7), 441.

Tait, Alexander N, Thomas Ferreira De Lima, Ellen Zhou, Allie X Wu, Mitchell A Nahmias, Bhavin J Shastri, and Paul R Prucnal (2017), "Neuromorphic photonic networks using silicon photonic weight banks," Scientific reports 7 (1), 1-10. Takata, Kenta, Alireza Marandi, Ryan Hamerly, Yoshitaka Haribara, Daiki Maruo, Shuhei Tamate, Hiromasa Sakaguchi, Shoko Utsunomiya, and Yoshihisa Yamamoto (2016), "A 16-bit coherent ising machine for one-dimensional ring and cubic graph problems," Scientific Reports 6 (1), 1-7.

Takesue, Hiroki, Kensuke Inaba, Takahiro Inagaki, Takuya Ikuta, Yasuhiro Yamada, Toshimori Honjo, Takushi Kazama, Koji Enbutsu, Takeshi Umeki, and Ryoichi Kasahara (2020), "Simulating ising spins in external magnetic fields with a network of degenerate optical parametric oscillators," Physical Review Applied 13 (5), 054059.

Tanaka, Gouhei, Toshiyuki Yamane, Jean Benoit Héroux, Ryosho Nakane, Naoki Kanazawa, Seiji Takeda, Hidetoshi Numata, Daiju Nakano, and Akira Hirose (2019), "Recent advances in physical reservoir computing: A review," Neural Networks 115, 100-123.

Wang, Cheng, Mian Zhang, Xi Chen, Maxime Bertrand, Amirhassan Shams-Ansari, Sethumadhavan Chandrasekhar, Peter Winzer, and Marko Lomčar (2018), "Integrated lithium niobate electro-optic modulators operating at cmos-compatible voltages," Nature 562 (7725), 101-104.

Weidemann, Sebastian, Mark Kremer, Tobias Helbig, Tobias Hofmann, Alexander Stegmaier, Martin Greiter, Ronny Thomale, and Alexander Szameit (2020), "Topological funneling of light," Science 368 (6488), 311-314.

Wolfram, Stephen (1983), "Statistical mechanics of cellular automata," Reviews of modern physics 55 (3), 601.

Wolfram, Stephen (1984), "Cellular automata as models of complexity," Nature 311 (5985), 419-424.

Xu, Xingyuan, Mengxi Tan, Bill Corcoran, Jiayang Wu, Andreas Boes, Thach G Nguyen, Sai T Chu, Brent E Little, Damien G Hicks, Roberto Morandotti, et al. (2021), "11 tops photonic convolutional accelerator for optical neural networks," Nature 589 (7840), 44-51.

Yamaoka, Masanao, Chihiro Yoshimura, Masato Hayashi, Takuya Okuyama, Hidetaka Aoki, and Hiroyuki Mizuno (2015), "A 20k-spin ising chip to solve combinatorial optimization problems with cmos annealing," IEEE Journal of Solid-State Circuits 51 (1), 303-309.

Yu, Mengjie, David Barton III, Rebecca Cheng, Christian Reimer, Prashanta Kharel, Lingyan He, Linbo Shao, Di Zhu, Yaowen Hu, Hannah R Grant, et al. (2022), "Integrated femtosecond pulse generator on thin-film lithium niobate," Nature, 1-7.

Yuan, Luqi, Qian Lin, Meng Xiao, and Shanhui Fan (2018), "Synthetic dimension in photonics," Optica 5 (11), 1396-1405.

Zhu, Di, Linbo Shao, Mengjie Yu, Rebecca Cheng, Boris Desiatov, C J Xin, Yaowen Hu, Jeffrey Holzgrafe, Soumya Ghosh, Amirhassan Shams-Ansari, et al. (2021), "Integrated photonics on thin-film lithium niobate," Advances in Optics and Photonics 13 (2), 242-352.

Zuo, Ying, Bohan Li, Yujun Zhao, Yue Jiang, You-Chivan Chen, Peng Chen, Gyu-Boong Jo, Junwei Liu, and Shengwang Du (2019), "All-optical neural network with nonlinear activation functions," Optica 6 (9), 1132-1137.

Second Embodiment: Time-Multiplexed Photonic Computer Architecture With Electronic Memory a. Architecture

Figure 9:
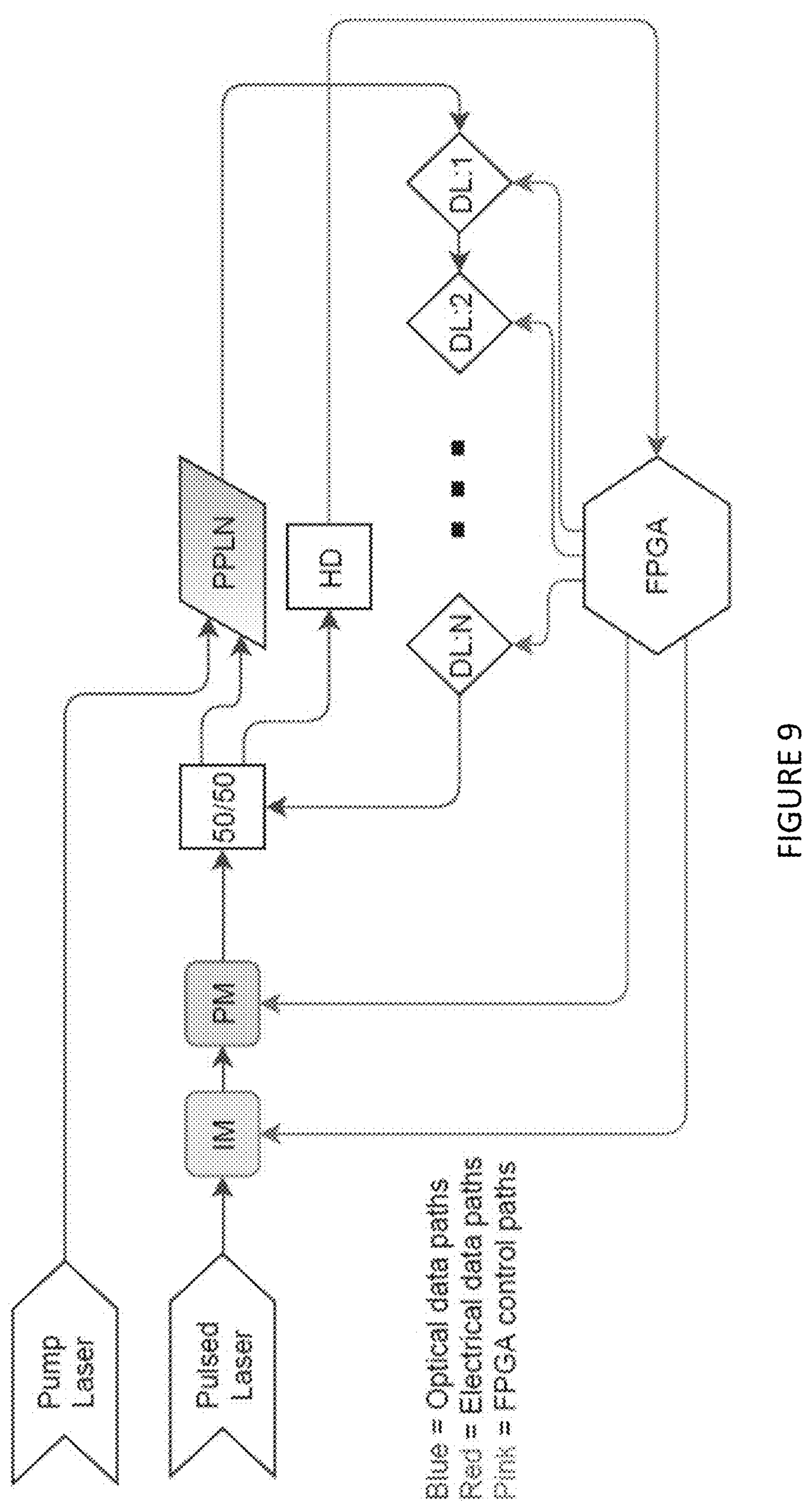
FIG. 9: Block schematic of the time-multiplexed optical-delay line architecture showing the connections between the various components including laser, intensity modulator (IM), phase modulator (PM), homodyne detector (HD), periodically poled lithium niobate (PPLN) crystal, field programmable gate array (FPGA), and delay lines (DL). Blue lines show optical data paths, red lines show electrical data paths, and pink lines show FPGA control paths.

FIG. 9*a* is a block schematic of an architecture using electronic memory. A laser is used to generate optical pulses at a repetition rate corresponding to the discrete time-multiplexed steps. The optical pulses enter a Mach-Zehnder interferometer to perform linear computations. In the top arm of the interferometer, there is one set of intensity modulator (IM) and phase modulator (PM) that acts to modulate the optical pulse amplitude $\alpha$. In the bottom arm of the interferometer, the first set of IM and PM act to modulate the optical pulse amplitude $\beta$, followed by the second set of IM and PM that modulate the optical pulse amplitude $\gamma$. Thus, the effective optical pulse amplitude after passing through the bottom arm of the interferometer is $\beta\times\gamma$.

The optical pulses coherently add at the output of the interferometer to give an effective optical pulse amplitude of $\alpha+\beta\times\gamma$. The optical pulse amplitude can then be detected, or sent through a periodically poled lithium niobate (PPLN) crystal to perform nonlinear operations via second harmonic generation (SHG) before being detected.

A summary of the SHG process can be found in the third Embodiment. The detection process uses balanced homodyne detectors that convert the optical pulse into an electrical signal directly proportional to the optical pulse amplitude. These pulse amplitudes are stored digitally in the FPGA, which acts as a virtual or synthetic cavity loop. The stored optical pulse amplitudes can be re-injected at the appropriate time by sending the corresponding control signals to the IMs and PMs. By measuring pulses at the output of the network and re-injecting them at the input, this setup can effectively perform optical computations that would normally require a closed resonator setup in which the gain and loss are as closely matched as possible to enable pulses to travel within the resonator for many round trips to complete a computation. Matching the gain and loss of a large resonator is experimentally challenging, and even small mismatches can prevent successful computation from taking place. By digitizing the pulses before and after they are interfered, this gain/loss problem is circumvented at the cost of using additional energy to operate the FPGA fabric instead of storing the pulses optically.

Various types of computations can be performed by programming the correct sequence of control signals for the modulators. Indeed, the optical pulse amplitude exiting the interferometer, $\alpha+\beta\times\gamma$, is precisely the desired output of a multiply-accumulate (MAC) operation. The MAC operation is the building block of a Euclidean inner product, which can then be executed in sequence to perform matrix multiplication. In addition, nonlinear activations can be performed by setting $\beta=\gamma=0$, which will produce the final output of $f(\alpha)$, where $f(\cdot)$ is the nonlinear transfer function corresponding to the PPLN. The amplitudes ($\alpha$, $\beta$, $\gamma$) can be any complex number with modulus less than or equal to unity, but the range of allowable values for computation can be adjusted by correctly scaling the particular problem. We note that the applications described in later sections only require real-valued computations, even though our architecture is capable of full complex-valued computations. We also emphasize that all computational (i.e. multiplications, additions, and nonlinear activations) operations occur entirely in the optical domain. The FPGA is only used for memory handling, and does not perform any computation. Next, we briefly describe possible experimental implementations of our architecture in both optical fiber and integrated photonics platforms.

b. Optical Fiber Implementation

One implementation of our architecture uses mostly commercially available off-the-shelf optical fiber components originally designed for telecommunications. By re-purposing these standardized components, it is possible to build a cost-effective and simple device.

Figure 10:
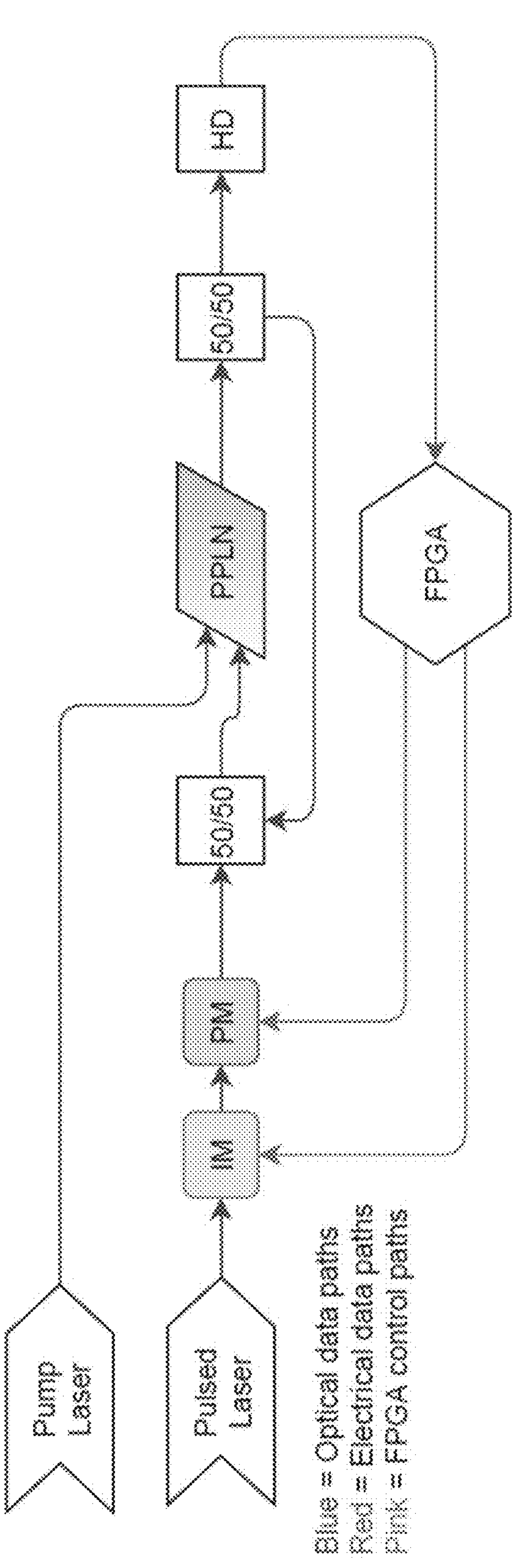
FIG. 10: Block schematic of the time-multiplexed measurement-feedback architecture showing the connections between the various components including laser, intensity modulator (IM), phase modulator (PM), homodyne detector (HD), periodically poled lithium niobate (PPLN) crystal, and field programmable gate array (FPGA). Blue lines show optical data paths, red lines show electrical data paths, and pink lines show FPGA control paths.

FIG. 10 illustrates a schematic of a possible optical fiber system and a detailed explanation of how the time-multiplexed optoelectronic architecture can compute an example multiplication. In this case, the pulsed laser is a mode-locked laser operating at a wavelength of 1550 nm with repetition rate of 250 MHz. The optical data paths are standard single mode fiber, and the Mach-Zehnder interferometer can be made using fiber splitters and couplers. The IMs and PMs are fiber-coupled, high-speed, lithium niobate electrooptic modulators for 1550 nm. Similarly, the HDs can be standard coherent optical fiber receivers for 1550 nm. The electrical data paths can simply be standard coaxial cable connections for interfacing the detectors, FPGA, and modulators. The only custom component is the PPLN, which is a weakly-guiding, reverse-proton-exchanged, fiber-coupled waveguide [5].

c. Photonic Integrated Circuit Implementation

Another implementation of our architecture uses a photonic integrated circuit in a thin-film lithium niobate (TFLN) chip. By integrating most of the components onto a single chip, we can greatly increase the speed and decrease the energy required for the computing. Conversely, this approach is also more difficult to implement since it requires cutting-edge thin-film lithium niobate fabrication capabilities.

Figure 11:
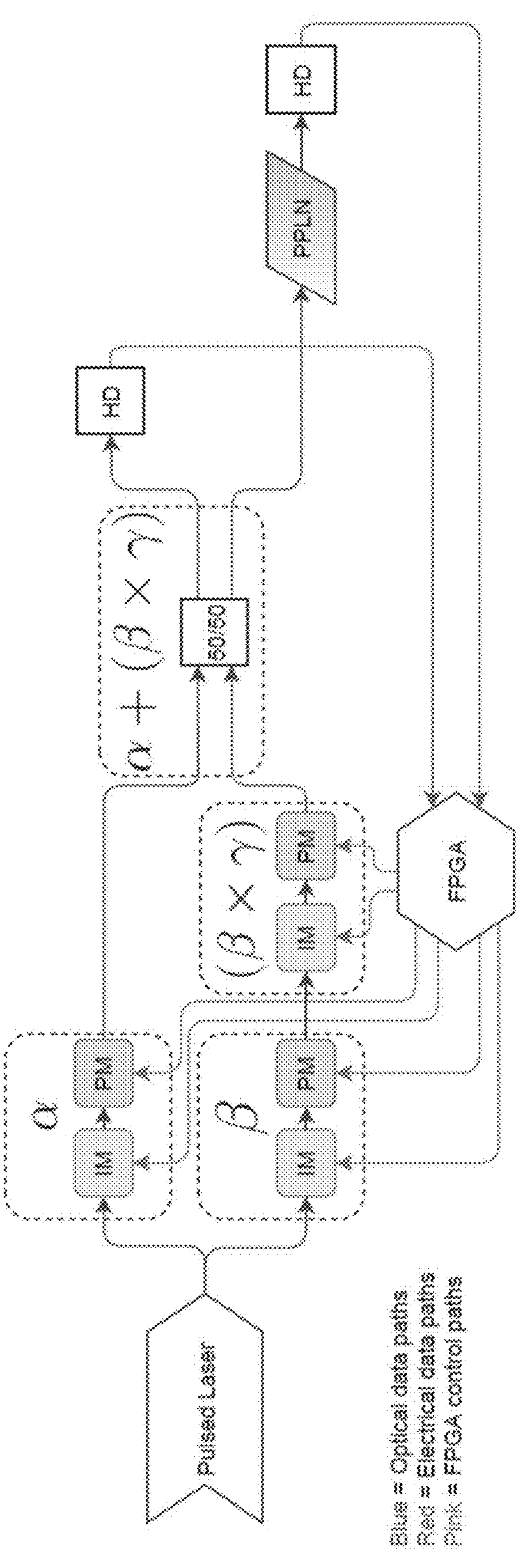
FIG. 11: (a) Block schematic of the time-multiplexed optoelectronic computing architecture showing the connections between the various components including laser, intensity modulator (IM), phase modulator (PM), homodyne detector (HD), periodically poled lithium niobate (PPLN) crystal, and field programmable gate array (FPGA). Blue lines show optical data paths, red lines show electrical data paths, and pink lines show FPGA control paths. (b) Flow chart showing the typical high-level information flow from optics to electronics.
Figure 11:
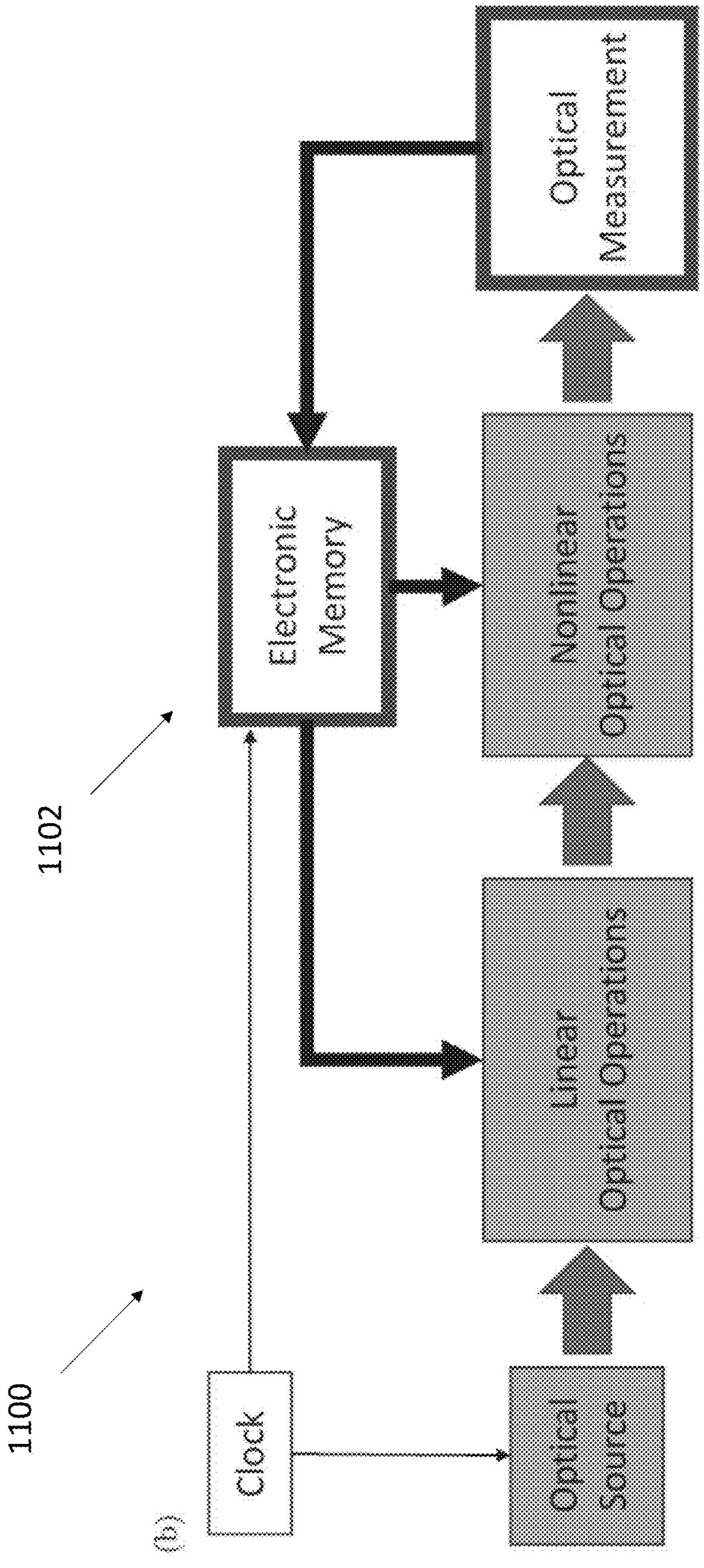
Figure 12:
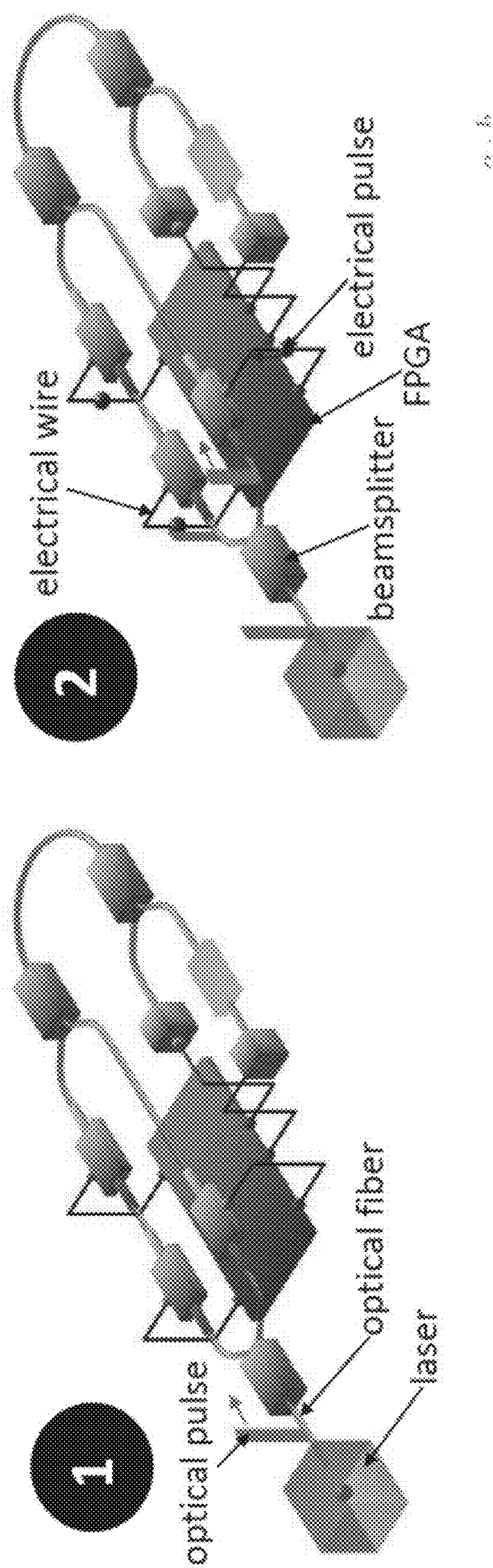
FIG. 12: Schematic (not to scale) of an optical fiber implementation of the time-multiplexed optoelectronic computing architecture illustrating an example of how it computes multiplication between two numbers, a and b, at different snapshots in time. (1) The laser generates optical pulses at a repetition rate that determines the global clock cycle of the system. (2) The optical pulse enters a beam-splitter where it is split into two branches as part of a Mach-Zehnder interferometer. Electrical pulses sent from the FPGA are synchronised with the optical pulses. (3) The electrical pulses drive the intensity modulators to multiply the appropriate factors to the optical pulse amplitude. (4) The optical pulses recombine at the output of the Mach-Zehnder interferometer, hence giving the desired multiplication a·b. (5) The optical pulse is sent to the homodyne detector. Alternatively, the optical pulse can also be sent through the PPLN to perform the nonlinear activation function f(a). (6) Homodyne detection extracts the optical pulse amplitude as an electrical output to be stored in the FPGA, which is later reinjected at the appropriate time to the modulators in order to construct more complicated computations.
Figure 12:
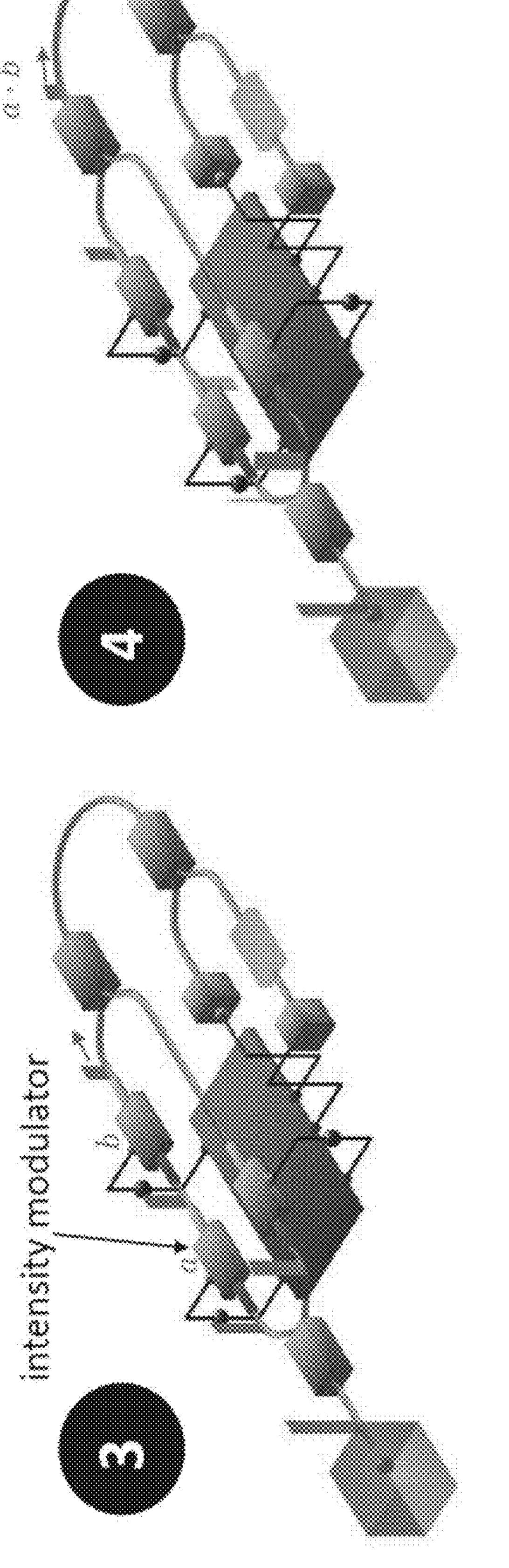
Figure 12:
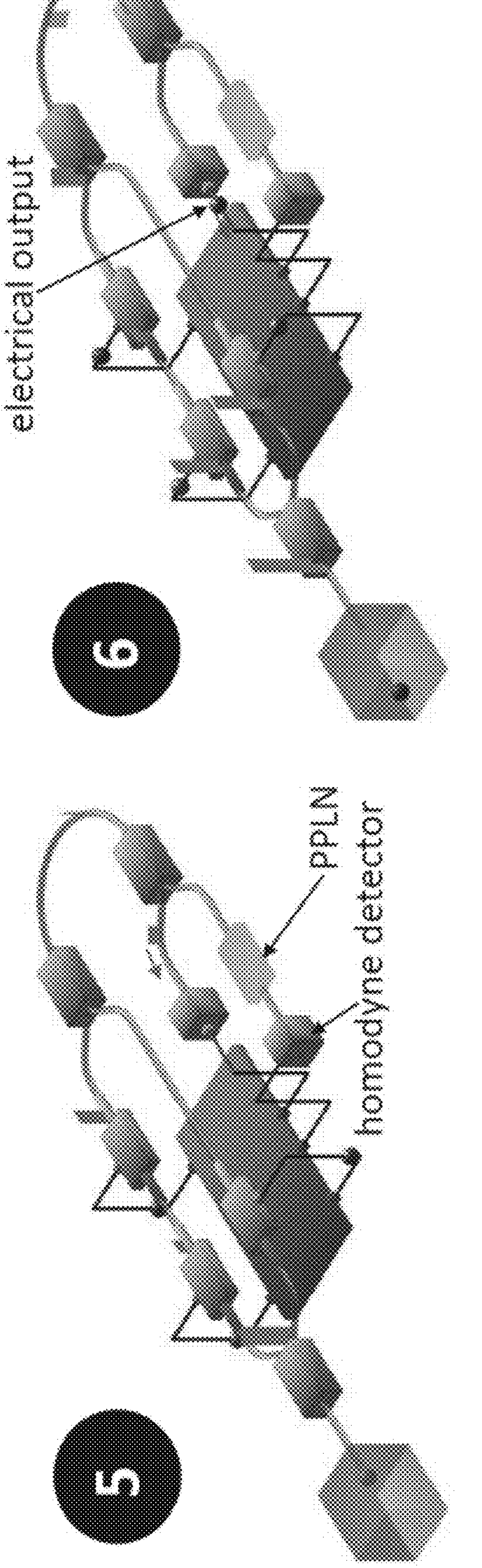
Figure 13:
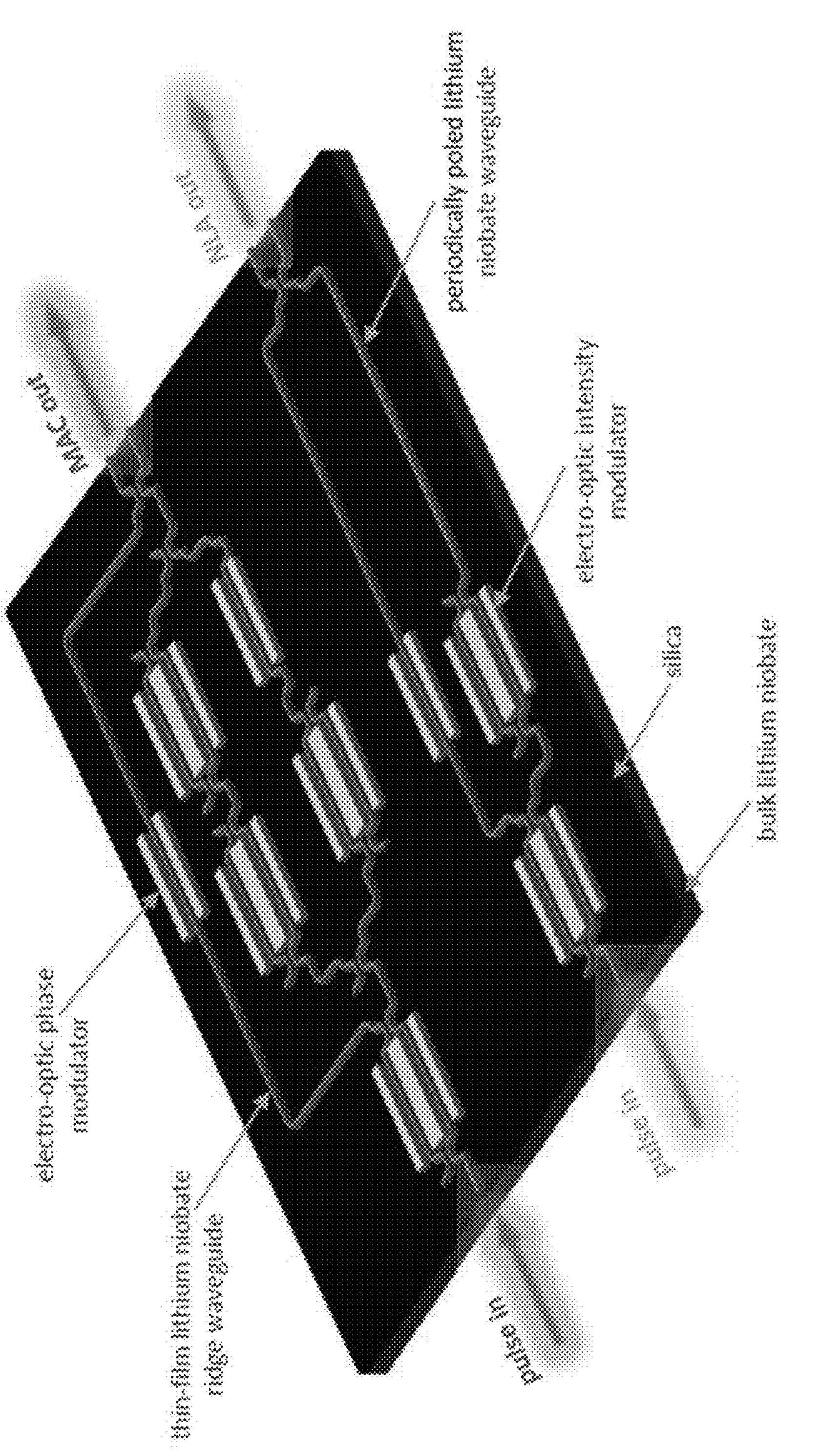
FIG. 13: Schematic (not to scale) of a photonic integrated circuit implementation of the time-multiplexed optoelectronic computing architecture in a thin-film lithium niobate on insulator platform. All optical components except for the laser source and photodetectors can be monolithically integrated on-chip. The electrical interfaces with the FPGA are omitted for clarity.

A schematic of a possible chip layout is shown in FIG. 11. In this case, the laser source is a degenerate optical parametric oscillator (OPO) operating at a wavelength of 2090 nm. This OPO is off-chip, however it is also possible to monolithically integrate an OPO source onto the chip [6]. The optical data paths are nanophotonic ridge waveguides on the TFLN chip. The Mach-Zehnder interferometer is custom designed using either a combination of directional couplers or y-branch couplers on the TFLN chip. The IMs and PMs are TFLN electro-optic modulators that can potentially reach bandwidths of 100 s of GHz [7]. Homodyne mixing and local oscillator control is also performed on the TFLN chip, but the custom-made balanced detectors are located off-chip. The detectors can interface with the FPGA via standard coaxial cables, whereas the electrical interface with the modulators is achieved using wire-bonding. The PPLN is a special dispersion-engineered TFLN waveguide that achieves ultra-broadband and efficient SHG [8].

d. Field Programmable Gate Array (FPGA) Architecture

The FPGA located in the experimental setup is responsible for driving the intensity and phase modulators used to implement the MAC operation and performing the read-out and storage of the final result. Unlike previous measurement-feedback architectures such as [3], no calculations are performed on this FPGA: it is merely used as electronic storage intended to replace the optical storage used in other implementations. Before a computation begins, the initial experimental parameters are loaded into the FPGA's on-chip memory via direct memory access (DMA) controller connected to DRAM located on the same printed circuit board as the FPGA. As the FPGA performs computations using the optical network, the MAC results are read-out and stored on on-chip memory. From here, these results may be re-used in future computations or read-out as final results by the user via the same DMA controller.

For small problems (N<1000), the FPGA's on-chip memory is sufficient to store the necessary experimental parameters (or 'weights' in the case of a neural network). Since this memory can be configured for an arbitrary bit-width with a single cycle access time, it does not create a bottleneck or limit the overall speed of the computation. For larger problems, the experimental parameters can no longer all fit simultaneously in the on-chip memory, necessitating the use of the much larger (typically 100 times or more) DRAM pool for parameter storage along with a caching scheme used to send more parameters to the FPGA when they are needed. Given that the fastest commercial DRAM speeds are in the tens of gigabytes per second, this bandwidth could potentially be exceeded by and therefore limit the speed of an FPGA running many optical networks in parallel. However other off-chip storage techniques such as network attached storage could overcome this limitation.

In one or more examples, storing pulses in the FPGA memory has advantages over storage in optical cavities in delay line architectures with limited connectivity (whilst still performing all computations entirely in the optical domain unlike measurement-feedback architectures that perform matrix multiplication on the FPGA).

Example Experimental Results [42]

Figure 14:
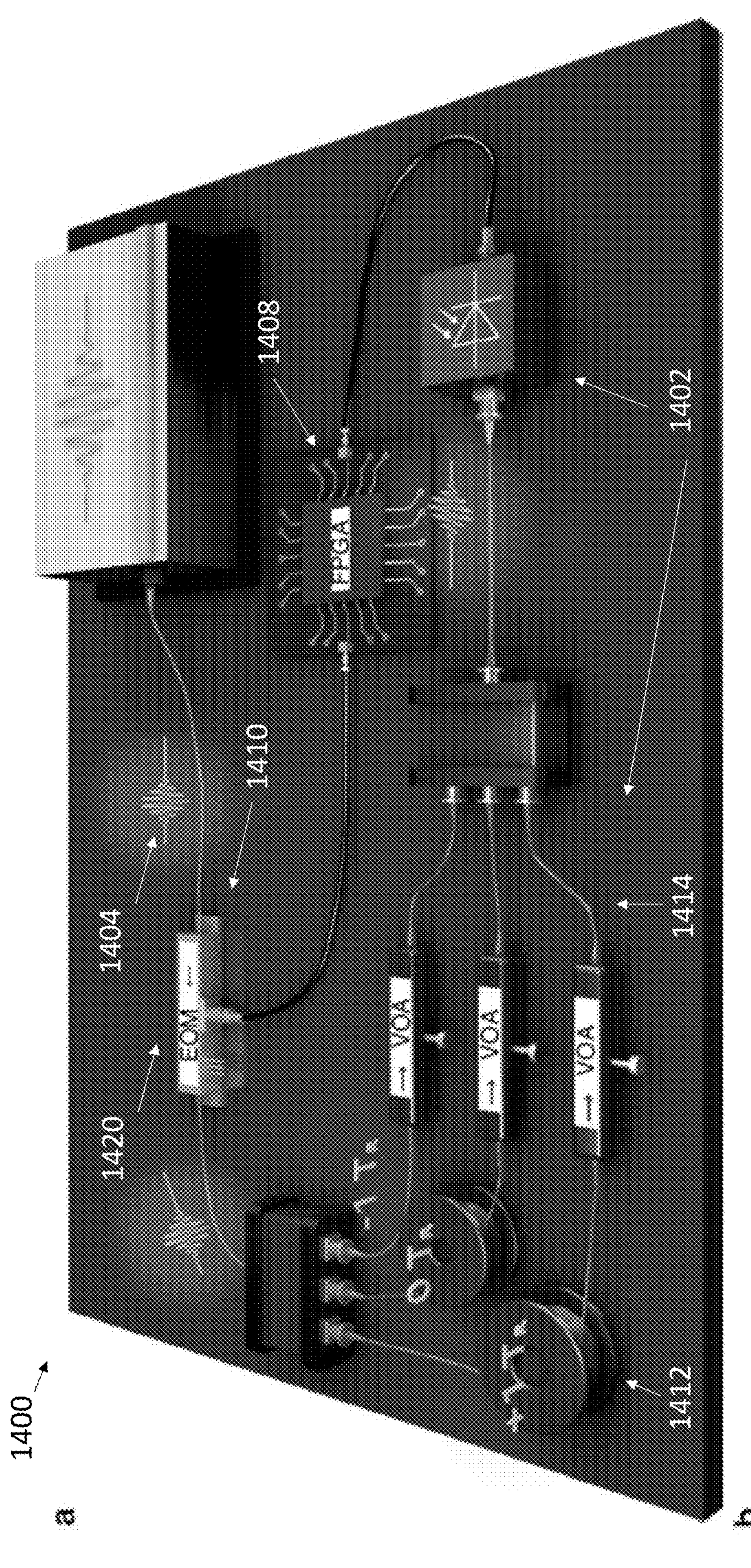
FIG. 14 Photonic platform for simulating complex phenomena using elementary cellular automata. a Schematic of the experimental setup. Cells are represented by pulses of light produced by a mode-locked laser (MLL) with a repetition rate of TR. The cell states are encoded by an electrooptic modulator (EOM) and are split into optical fiber delay lines (blue lines) to induce local interactions of neighboring light pulses. Specific ECA rules are programmed by tuning the variable optical attenuator (VOA) in each delay line. Optoelectronic thresholding is performed following the coherent interference of light pulses, with the resultant cell states stored on a field-programmable gate array (FPGA) and reinjected (black lines) to drive the input EOM for the next iteration. b Truth table showing the uniform and synchronous update for ECA Rule 90, with the top row in each case representing the current states of the three-cell neighborhood and the bottom row showing the cell state during the next iteration. c Block diagram showing the different stages of computation and flow of information in the photonic ECA implementation. From [42]
Figure 14:
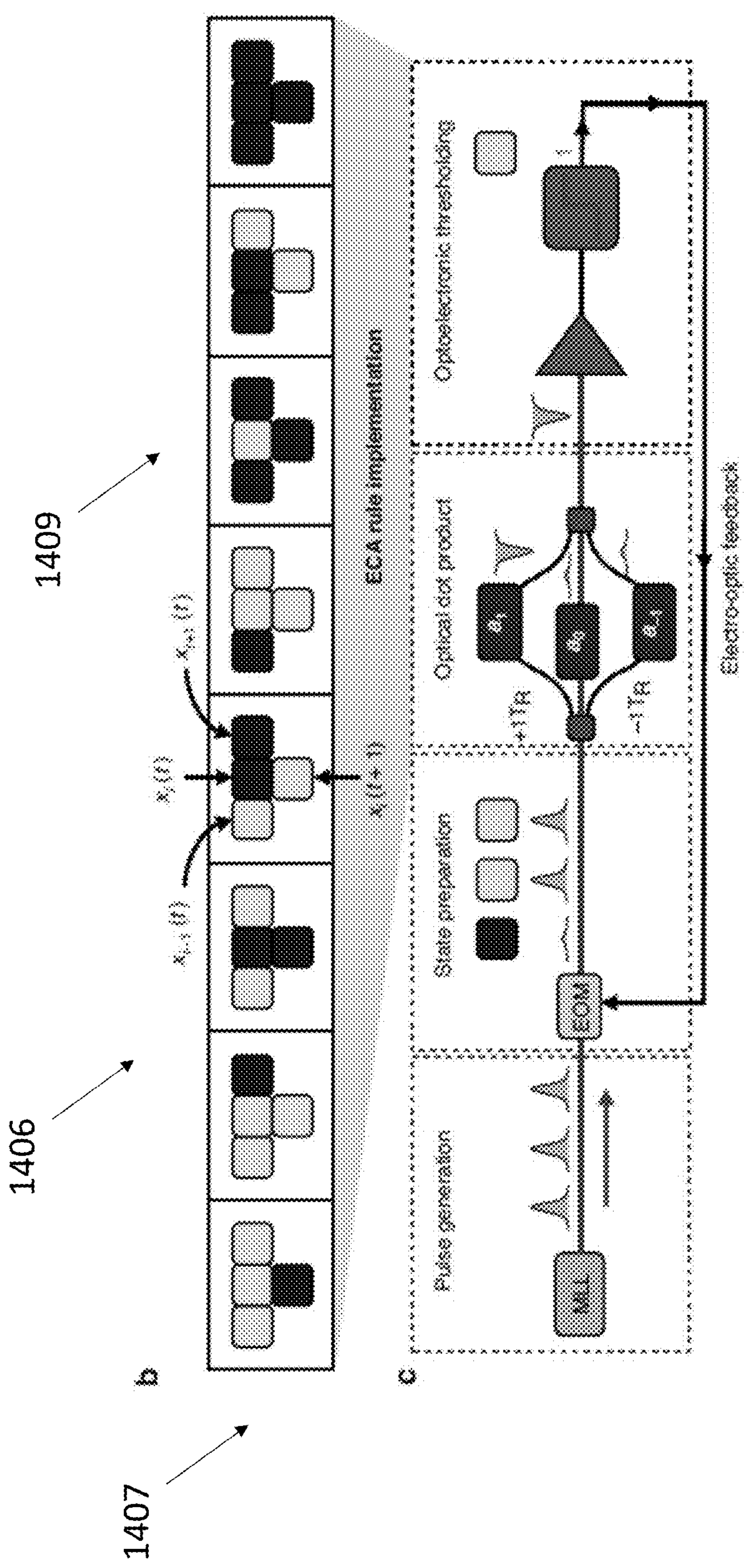

FIG. 14 illustrates a device 1400 comprising a programmable photonic processor 1402 configured to operate on optical pulses 1404 to perform computational sequences 1406 of linear operations and nonlinear operations each based on a parametric nonlinear optical process; and a memory 1408 (comprising FPGA) coupled to the processor and programmable to store or accumulate the analog optical pulse amplitudes of the optical pulses. A control circuit can be used to control the transfer of the analog optical pulse amplitudes between the processor and the memory according to a computation schedule 1407.

The device further comprises the processor and memory coupled by programmable couplers 1410 (comprising modulator 1420) to allow the partial or complete transfer of the optical pulses between processor and memory by means of coherent interference of the optical pulses.

Figure 15:
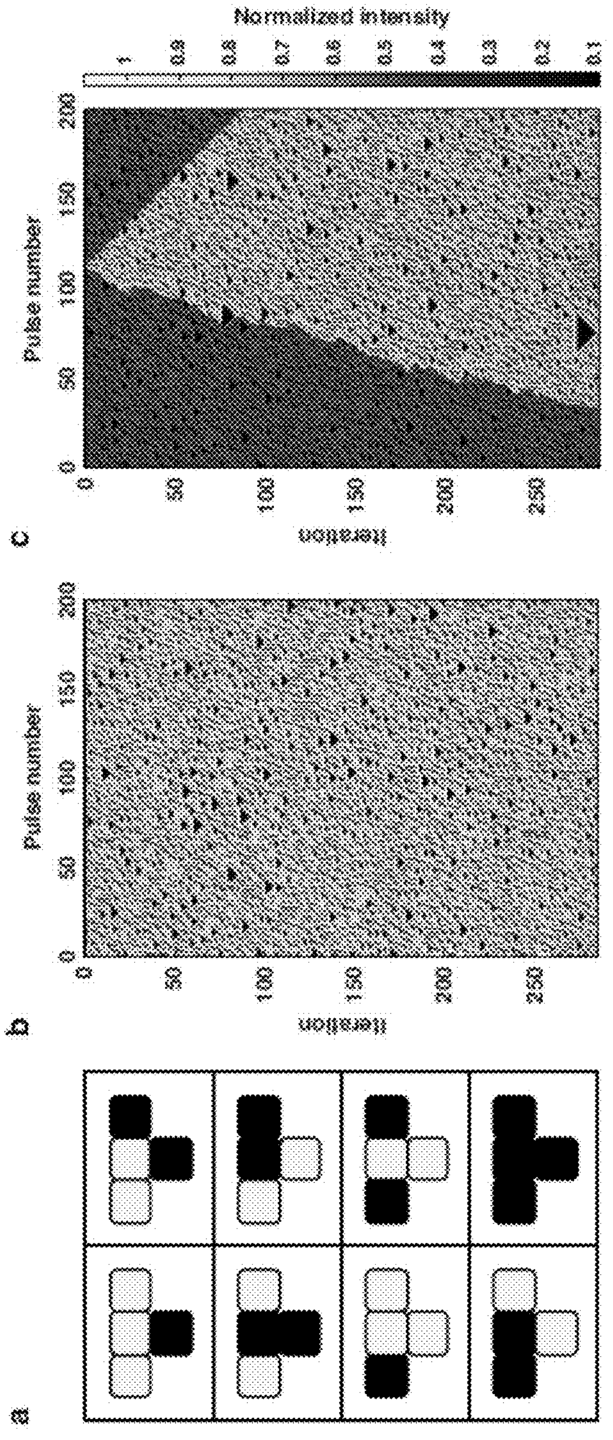
FIG. 15 Experimental result of ECA Rule 90 on the photonic hardware starting from a single live cell. a Zoomed-out equivalent space-time diagram showing the emergence of the Sierpinski Triangle fractal. b Zoomed-in view showing the fractal self-similarity down to the cellular scale. c Time traces (vertically separated for easier viewing) of the individual light pulses representing each cell separated by 4 ns [42]
Figure 16:
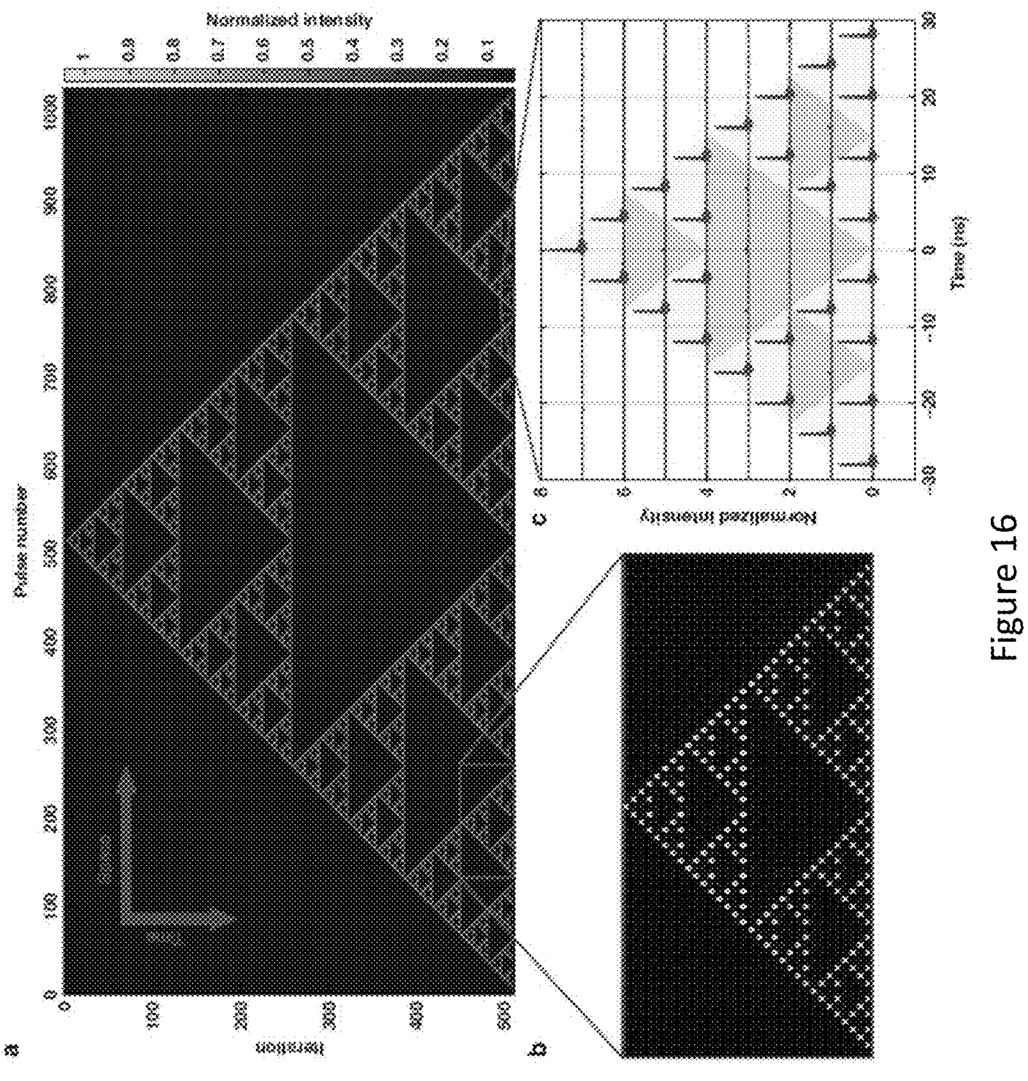
FIG. 16 Chaotic patterns produced by ECA Rule 30 on the time-multiplexed photonic hardware. a Truth table showing the update for ECA Rule 30. b Space-time diagram of ECA Rule 30 starting from a random initial condition showing chaotic dynamics. c Inverting a single cell state in the initial condition produces a pattern with differences that grow linearly to the right and asymptotically linearly to the left (regions that are different to (b) are highlighted, and regions that are identical are displayed as partially transparent), hence demonstrating sensitivity to initial conditions. From [42]

FIGS. 15 and 16 demonstrate experimental results showing the photonic processor has performed computation sequences 1406 according to a cellular automata model, wherein information 1409 was successfully multiplexed in time by encoding the information onto the analog optical pulse amplitudes of the optical pulses occupying time bins 1412 at a fixed repetition rate such that the optical pulses, occupying different ones of the time bins, can be made to interact using appropriate temporal delays 1414.

Further information on one or more embodiments of the present invention can be found in [42].

References For Second Example

The following references are incorporated by reference herein

[1] A. Marandi, Z. Wang, K. Takata, R. L. Byer, and Y. Yamamoto, "Network of time-multiplexed optical parametric oscillators as a coherent ising machine," Nature Photonics, vol. 8, no. 12, pp. 937-942, 2014.

[2] C. Leefmans, A. Dutt, J. Williams, L. Yuan, M. Parto, F. Nori, S. Fan, and A. Marandi, "Topological dissipation in a time-multiplexed photonic resonator network," arXiv preprint arXiv:2104.05213, 2021.

[3] P. L. McMahon, A. Marandi, Y. Haribara, R. Hamerly, C. Langrock, S. Tamate, T. Inagaki, H. Takesue, S. Utsunomiya, K. Aihara, et al., "A fully programmable 100-spin coherent ising machine with all-to-all connections," Science, vol. 354, no. 6312, pp. 614-617, 2016.

[4] T. Inagaki, Y. Haribara, K. Igarashi, T. Sonobe, S. Tamate, T. Honjo, A. Marandi, P. L. McMahon, T. Umeki, K. Enbutsu, et al., "A coherent ising machine for 2000-node optimization problems," Science, vol. 354, no. 6312, pp. 603-606, 2016.

[5] C. Langrock and M. Fejer, "Fiber-feedback continuous-wave and synchronously-pumped singly-resonant ring optical parametric oscillators using reverse-proton-exchanged periodically-poled lithium niobate waveguides," Optics letters, vol. 32, no. 15, pp. 2263-2265, 2007.

[6] J. Lu, A. Al Sayem, Z. Gong, J. B. Surya, C.-L. Zou, and H. X. Tang, "Ultralow-threshold thin-film lithium niobate optical parametric oscillator," Optica, vol. 8, no. 4, pp. 539-544, 2021.

[7] M. Zhang, C. Wang, P. Kharel, D. Zhu, and M. Lončar, "Integrated lithium niobate electro-optic modulators: when performance meets scalability," Optica, vol. 8, no. 5, pp. 652-667, 2021.

[8] M. Jankowski, C. Langrock, B. Desiatov, A. Marandi, C. Wang, M. Zhang, C. R. Phillips, M. Lončar, and M. Fejer, "Ultrabroadband nonlinear optics in nanophotonic periodically poled lithium niobate waveguides," Optica, vol. 7, no. 1, pp. 40-46, 2020.

[9] M. Lukoševičius and H. Jaeger, "Reservoir computing approaches to recurrent neural network training," Computer Science Review, vol. 3, no. 3, pp. 127-149, 2009.

[10] G.-B. Huang, D. H. Wang, and Y. Lan, "Extreme learning machines: a survey," International journal of machine learning and cybernetics, vol. 2, no. 2, pp. 107-122, 2011.

[11] H. Jaeger, "Short term memory in echo state networks. gmd-report 152," in GMD-German National Research Institute for Computer Science (2002), http://www.faculty. jacobs-university. de/hjaeger/pubs/STMEchoStatesTechRep. pdf, Citeseer, 2002.

[12] M. Inubushi and K. Yoshimura, "Reservoir computing beyond memory-nonlinearity trade-off," Scientific reports, vol. 7, no. 1, pp. 1-10, 2017.

[13] G. Tanaka, T. Yamane, J. B. Héroux, R. Nakane, N. Kanazawa, S. Takeda, H. Numata, D. Nakano, and A. Hirose, "Recent advances in physical reservoir computing: A review," Neural Networks, vol. 115, pp. 100-123, 2019.

[14] D. Brunner, M. C. Soriano, and G. Van der Sande, Photonic Reservoir Computing: Optical Recurrent Neural Networks. Walter de Gruyter GmbH & Co KG, 2019.

[15] G. Van der Sande, D. Brunner, and M. C. Soriano, "Advances in photonic reservoir computing," Nanophotonics, vol. 6, no. 3, pp. 561-576, 2017.

[16] L. Larger, A. Baylón-Fuentes, R. Martinenghi, V. S. Udaltsov, Y. K. Chembo, and M. Jacquot, "Highspeed photonic reservoir computing using a time-delay-based architecture: Million words per second classification," Physical Review X, vol. 7, no. 1, p. 011015, 2017.

[17] D. Brunner, M. C. Soriano, C. R. Mirasso, and I. Fischer, "Parallel photonic information processing at gigabyte per second data rates using transient states," Nature communications, vol. 4, no. 1, pp. 1-7, 2013.

[18] F. Duport, B. Schneider, A. Smerieri, M. Haelterman, and S. Massar, "All-optical reservoir computing," Optics express, vol. 20, no. 20, pp. 22783-22795, 2012.

[19] F. Duport, A. Smerieri, A. Akrout, M. Haelterman, and S. Massar, "Fully analogue photonic reservoir computer," Scientific reports, vol. 6, no. 1, pp. 1-12, 2016.

[20] S. Ortín, M. C. Soriano, L. Pesquera, D. Brunner, D. San-Martín, I. Fischer, C. Mirasso, and J. Gutiérrez, "A unified framework for reservoir computing and extreme learning machines based on a single time-delayed neuron," Scientific reports, vol. 5, no. 1, pp. 1-11, 2015.
[21] Y. LeCun, Y. Bengio, and G. Hinton, "Deep learning," nature, vol. 521, no. 7553, pp. 436-444, 2015.
[22] C. D. Schuman, T. E. Potok, R. M. Patton, J. D. Birdwell, M. E. Dean, G. S. Rose, and J. S. Plank, "A survey of neuromorphic computing and neural networks in hardware," arXiv preprint arXiv:1705.06963, 2017.
[23] P. R. Prucnal and B. J. Shastri, Neuromorphic photonics. CRC Press, 2017.
[24] M. A. Nahmias, T. F. De Lima, A. N. Tait, H.-T. Peng, B. J. Shastri, and P. R. Prucnal, "Photonic multiply-accumulate operations for neural networks," IEEE Journal of Selected Topics in Quantum Electronics, vol. 26, no. 1, pp. 1-18, 2019.
[25] X. Xu, M. Tan, B. Corcoran, J. Wu, A. Boes, T. G. Nguyen, S. T. Chu, B. E. Little, D. G. Hicks, R. Morandotti, et al., "11 tops photonic convolutional accelerator for optical neural networks," Nature, vol. 589, no. 7840, pp. 44-51, 2021.
[26] C. Ríos, N. Youngblood, Z. Cheng, M. Le Gallo, W. H. Pernice, C. D. Wright, A. Sebastian, and H. Bhaskaran, "In-memory computing on a photonic platform," Science advances, vol. 5, no. 2, p. eaau5759, 2019.
[27] J. Feldmann, N. Youngblood, C. D. Wright, H. Bhaskaran, and W. Pernice, "All-optical spiking neurosynaptic networks with self-learning capabilities," Nature, vol. 569, no. 7755, pp. 208-214, 2019.
[28] J. Feldmann, N. Youngblood, M. Karpov, H. Gehring, X. Li, M. L. Gallo, X. Fu, A. Lukashchuk, A. Raja, J. Liu, et al., "Parallel convolution processing using an integrated photonic tensor core," arXiv preprint arXiv: 2002.00281, 2020.
[29] A. N. Tait, T. F. De Lima, E. Zhou, A. X. Wu, M. A. Nahmias, B. J. Shastri, and P. R. Prucnal, "Neuromorphic photonic networks using silicon photonic weight banks," Scientific reports, vol. 7, no. 1, pp. 1-10, 2017.
[30] Y. Shen, N. C. Harris, S. Skirlo, M. Prabhu, T. Baehr-Jones, M. Hochberg, X. Sun, S. Zhao, H. Larochelle, D. Englund, et al., "Deep learning with coherent nanophotonic circuits," Nature Photonics, vol. 11, no. 7, p. 441, 2017.
[31] M. Miscuglio, Z. Hu, S. Li, J. K. George, R. Capanna, H. Dalir, P. M. Bardet, P. Gupta, and V. J. Sorger, "Massively parallel amplitude-only Fourier neural network," Optica, vol. 7, no. 12, pp. 1812-1819, 2020.
[32] R. Hamerly, L. Bernstein, A. Sludds, M. Soljačić, and D. Englund, "Large-scale optical neural networks based on photoelectric multiplication," Physical Review X, vol. 9, no. 2, p. 021032, 2019.
[33] X. Guo, T. D. Barrett, Z. M. Wang, and A. Lvovsky, "Backpropagation through nonlinear units for all-optical training of neural networks," arXiv preprint arXiv: 1912.12256, 2019.
[34] X. Lin, Y. Rivenson, N. T. Yardimci, M. Veli, Y. Luo, M. Jarrahi, and A. Ozcan, "All-optical machine learning using diffractive deep neural networks," Science, vol. 361, no. 6406, pp. 1004-1008, 2018.
[35] Y. Zuo, B. Li, Y. Zhao, Y. Jiang, Y.-C. Chen, P. Chen, G.-B. Jo, J. Liu, and S. Du, "All-optical neural network with nonlinear activation functions," Optica, vol. 6, no. 9, pp. 1132-1137, 2019.
[36] L. Bernstein, A. Sludds, R. Hamerly, V. Sze, J. Emer, and D. Englund, "Freely scalable and reconfigurable optical hardware for deep learning," arXiv preprint arXiv:2006.13926, 2020.
[37] D. A. Miller, "Perfect optics with imperfect components," Optica, vol. 2, no. 8, pp. 747-750, 2015.
[38] B. A. Cipra, "The ising model is np-complete," SIAM News, vol. 33, no. 6, pp. 1-3, 2000.
[39] A. Lucas, "Ising formulations of many np problems," Frontiers in physics, vol. 2, p. 5, 2014.
[40] R. Hamerly, T. Inagaki, P. L. McMahon, D. Venturelli, A. Marandi, T. Onodera, E. Ng, C. Langrock, K. Inaba, T. Honjo, et al., "Experimental investigation of performance differences between coherent ising machines and a quantum annealer," Science advances, vol. 5, no. 5, p. eaau0823, 2019.
[41] Y. Yamamoto, K. Aihara, T. Leleu, K.-i. Kawarabayashi, S. Kako, M. Fejer, K. Inoue, and H. Takesue, "Coherent ising machines—optical neural networks operating at the quantum limit," npj Quantum Information, vol. 3, no. 1, pp. 1-15, 2017.
[42] Li et al. Light: Science & Applications (2023) 12:132 Official journal of the CIOMP 2047-7538 https://doi.org/10.1038/s41377-023-01180-9

Third Example Use of Second Harmonic Generation For Nonlinear Interactions

The coupled-mode equations for travelling-wave second-order nonlinear optical interactions are:

$$\frac{d}{dz}A(z) = -i\kappa^* A^*(z)B(z)\exp[-i(2\Delta)z],$$

$$\frac{d}{dz}B(z) = -i\kappa[A(z)]^2\exp[+i(2\Delta)z]$$

where z is the propagation direction coordinate, A(z) is the fundamental wave amplitude, B(z) is the second harmonic wave amplitude, κ is the nonlinear coupling coefficient, and 2Δ is the phase mismatch parameter. The exact solution to Eqs. A.1 for second harmonic generation assuming $A(0)=A_0$, B(0)=0, perfect phase matching 2Δ=0, and real κ is:

$$A(z) = A_0\operatorname{sech}(\kappa A_0 z),$$

$$B(z) = -iA_0\tanh(\kappa A_0 z).$$

Figure 17:
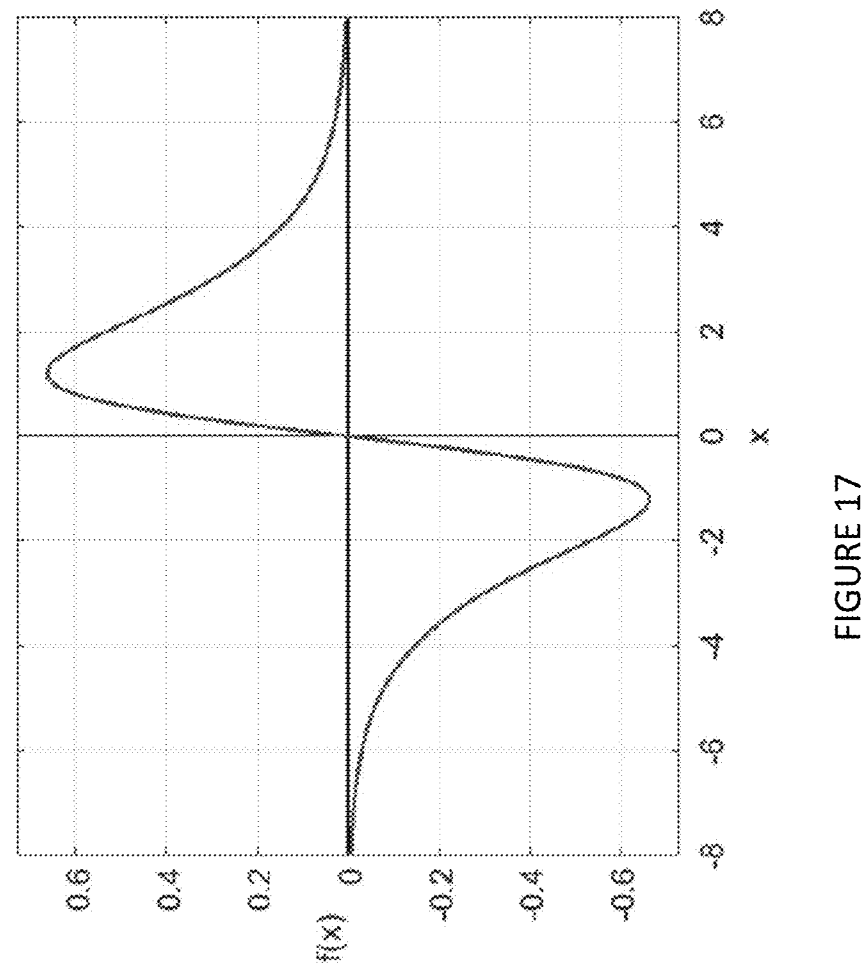
FIG. 17: Plot of f(x)=x·sec h(x).

In the setup, the PPLN crystal is quasi-phase matched to enable second harmonic generation according to Eqs. A.2. The second harmonic wave is discarded, and only the fundamental wave output is kept. Therefore, the nonlinear function describing the input-output amplitude characteristics of the PPLN is of the form: $f(x)=x\cdot\sec h(x)$, shown in FIG. 17. This form of $f(x)$ is smooth and bounded, which makes it suitable as the nonlinear activation function for the ESN and MLP.

Figure 18:
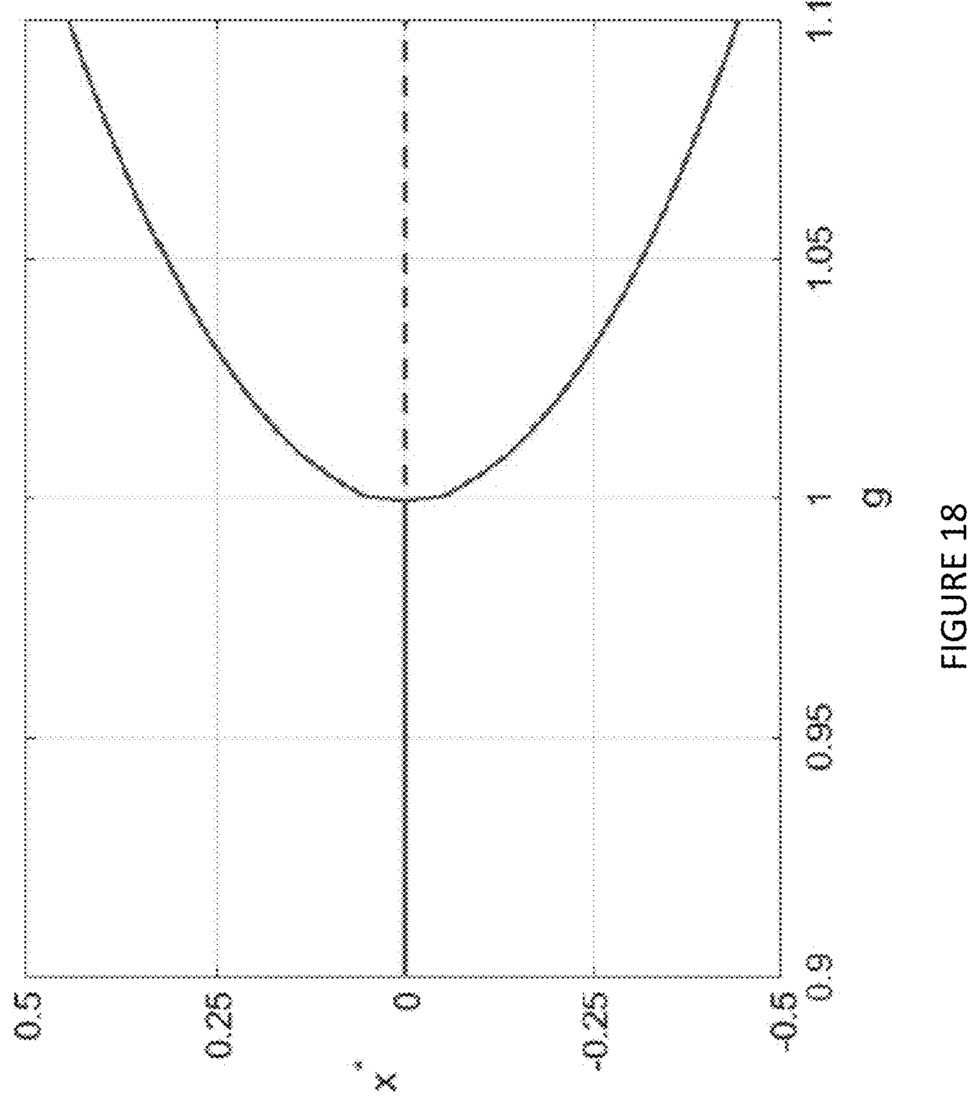
FIG. 18: Bifurcation diagram for x(t+1)=g·f(x(t)) showing a supercritical pitchfork bifurcation at g=1. The bold lines indicate stable fixed points x__ and the dashed line represents unstable fixed points.

Furthermore, consider the simple dynamical system $x(t+1)=g\cdot f(x(t))$. The fixed points are x=0, $\pm\sec h^{-1}(1/g)$. Thus, there exists a supercritical pitchfork bifurcation at g=1. This can be more easily seen by expanding $f(x)\approx x-x^3/2+\mathcal{O}(x^5)$ to achieve the appropriate normal form. The bifurcation diagram for this simple example is shown in FIG. 18. The bifurcation implies that $f(x)$ is suitable as the nonlinear function for the Ising machine since it allows for spontaneous symmetry breaking.

Process Steps

Method of Making

Figure 19:
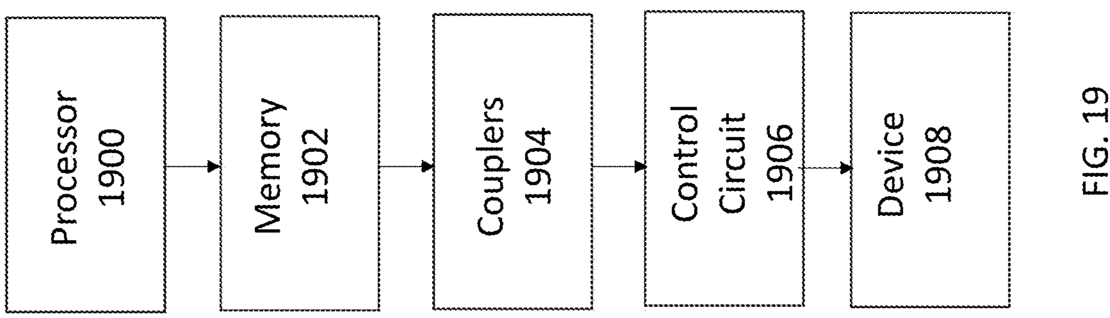
FIG. 19. Flowchart illustrating a method of making a device according to one or more embodiments.

FIG. 19 is a flowchart illustrating a method of fabricating a device, comprising the following steps (referring also to FIGS. 1-21).

Block 1900 represents designing and fabricating (e.g., photolithographically patterning) a photonic processor (e.g., first OPO) programmable to operate on optical pulses to perform computational sequences of linear operations and nonlinear operations each based on a parametric nonlinear optical process.

Block 1902 represents providing and coupling a memory (e.g., comprising a second OPO or electronic circuit) to the processor, wherein the memory is programmable to store or accumulate the analog optical pulse amplitudes of the optical pulses.

In one or more examples, the OPOs each comprise waveguides each having a width and height of less than 5 micrometers. In one or more examples, the design and fabrication comprised phase matching and/or dispersion engineering the waveguides for nonlinear interactions of the optical pulses having a bandwidth in a range of 0.1-100 Terahertz.

In typical examples, the waveguides comprise a waveguide appropriately phase matched for converting an input pump pulse into a signal pulse and/or idler pulse according to a second order or third order parametric interaction/amplification process using the second order or third order nonlinearity. In one or more examples, the waveguide is phase matched by periodic poling of the nonlinear material (e.g., ferromagnetic material). An example waveguide fabrication process is described in Few-cylce vacuum squeezing in nanophotonics, by Nehra, Rajveer and Sekine, Ryoto and Ledezma, Luis and Guo, Qiushi and Gray, Robert M. and Roy, Arkadev and Marandi, Alireza (2022) Science, 377 (6612). pp. 1333-1337, which reference is incorporated by reference herein.

In typical examples, the waveguides are also dispersion engineered by selecting dimensions so as to minimize group velocity mismatch (GVM) between pump and signal pulses so as to provide temporal overlap of the pump and signal pulses. In one or more examples, the, waveguides have the length in a range of 10 microns to 1 mm. Example dispersion engineering is described in "Intense optical parametric amplification in dispersion-engineered nanophotonic lithium niobate waveguides LUIS LEDEZMA, RYOTO SEKINE, QIUSHI GUO, RAJVEER NEHRA, SAMAN JAHANI, AND ALIREZA MARANDI. https://arxiv.org/pdf/2104.08262.pdf, Optica 9(3) 303-308 (2022) https://doi.org/10.48550/arXiv.2104.08262" which is incorporated by reference herein.

Example materials for the waveguide having the second order nonlinearity include, but are not limited to, lithium niobate, lithium tantalate, Potassium Titanyl Phosphate (KTP), aluminum nitride, gallium arsenide, indium phosphide, aluminum gallium arsenide, GaP, or InGaP.

In one or more examples, the (e.g., nonlinear) material is patterned on a substrate to form a waveguides configured in the photonic integrated circuit. In one or more examples, the substrate comprises lithium niobate on silicon dioxide, and the waveguides are patterned in the lithium niobate (e.g., monolithic integration of the waveguides).

Block 1904 represents optionally providing programmable couplers between the processor and memory, the programmable couplers 1410, 211, 312 programmable to allow the partial or complete transfer of the optical pulses between processor and memory by means of coherent interference of the optical pulses.

In various examples, the programmable couplers 312 comprise a waveguide 209 or fiber coupled to a modulator 208, 310, 610 comprising material (e.g., liquid crystal or nonlinear material, or electro-optic material, or thermo-optic material) thermally or electrically coupled to an electrode, wherein application of a voltage to the electrode controls, e.g., resistive heating, piezoelectric actuation, bi refringence, or electro-optic actuation of the material so as to control a phase or amplitude of the electromagnetic field of the optical pulses passing through the material.

Block 1906 represents providing and coupling a control circuit controlling the transfer of the analog optical pulse amplitudes between the processor and the memory according to a computation schedule; so that information is multiplexed in time by encoding the information onto the analog optical pulse amplitudes of the optical pulses occupying time bins at a fixed repetition rate such that the optical pulses, occupying different ones of the time bins, can be made to interact using appropriate temporal delays.

Figure 21:
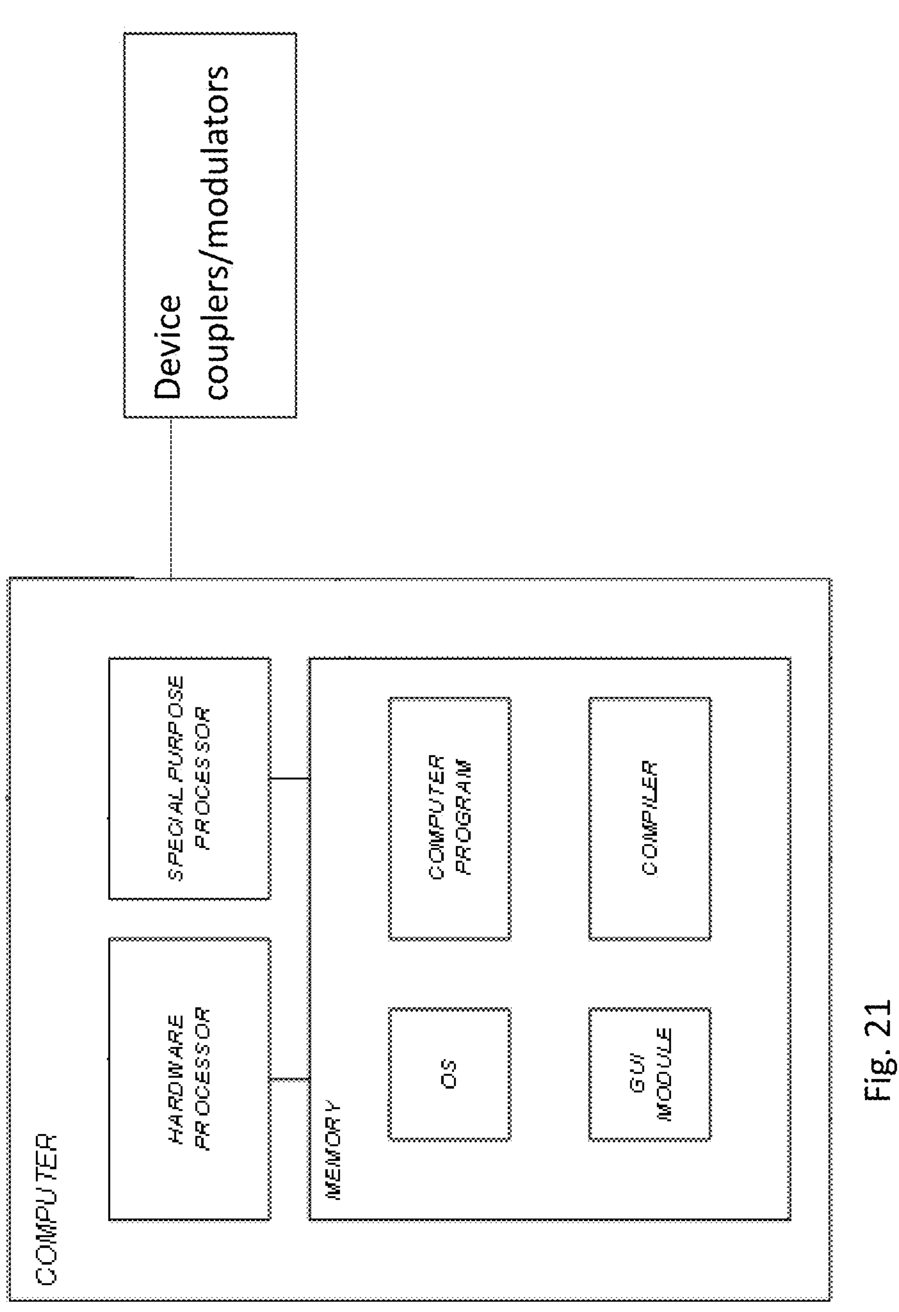
FIG. 21. Control circuit according to one or more embodiments.

In one or more examples, the control circuit comprises a Field Programmable Gate Array (FPGA), Application Specific Integrated Circuit (ASIC), or computer as illustrated in FIG. 21 comprising one or more processors executing a program stored on one or more memories.

Block 1908 represents the end result, a device. The device can be embodied in many ways including, but not limited to, the following embodiments (referring also to FIGS. 1-18 and 20).

1. A device 200, 1900, comprising:

a programmable photonic processor 202, 1402 configured to/programmable to operate on optical pulses 203, 1404 to perform computational sequences 1406 of linear operations and nonlinear operations each based on a parametric nonlinear optical process 210;

a memory 204, 1408 coupled to the processor and programmable to store or accumulate the analog optical pulse amplitudes of the optical pulses;

a control circuit 206 controlling the transfer 211 of the analog optical pulse amplitudes between the processor and the memory according to a computation schedule 1407; and wherein information 1409 is multiplexed in time by encoding the information onto the analog optical pulse amplitudes of the optical pulses occupying time bins 1412 at a fixed repetition rate such that the optical pulses, occupying different ones of the time bins, can be made to interact using appropriate temporal delays 1414.

2. The device 330, 600 of embodiment 1, wherein:

the processor comprises a first cavity **202*a* comprising a first optical parametric oscillator (OPO), e.g., comprising a waveguide 306*a*, 606*a*** comprising a nonlinear material having a second order nonlinearity;

the memory comprises a second cavity **204*a* comprising a second OPO (e.g. comprising a second waveguide 306*b*, 606*b* comprising a nonlinear material having a second order nonlinearity; and the OPOs each generate the optical pulses comprising signal 304, 604 and/or idler pulses in response to a pump pulse 302, 304 using the parametric nonlinear optical process (in the waveguide) comprising at least one of a second order process or third order parametric process; and the first cavity and the second cavity are coupled by programmable couplers 1410, 211, 312** to allow the partial or complete transfer of the optical pulses between the first cavity and the second cavity by means of coherent interference of the optical pulses in the programmable couplers.

3. The device of embodiment 2, wherein:

the signal pulses 304, 604 comprise one or more input pulses and one or more output pulses;

the control circuit implements the computation schedule by:

selecting each of the operations on each of the input pulses, to form the output pulses, by setting an amplitude of the pump pulses in the first OPO and the second OPO during the operations, such that the OPOs can be operated in either a linear regime in which the parametric gain equals the roundtrip linear loss, or in a highly nonlinear regime in which the parametric gain is saturated; and controlling the transfer 211 of one or more of the signal pulses comprising the analog optical pulse amplitudes between the processor and the memory.

4. The device of embodiment 3, wherein:

the computation schedule comprises a database comprising a sequence of modulator levels (e.g., voltage) each assigned to a different one of the time bins associated with a different one of the signal pulses; and the control circuit executes the computation schedule by applying the modulator levels to:

the couplers 1410, 211 to control the transfer 213 of the signal pulses; and a modulator 608 to control the amplitude of the pump pulses, and during the time bins associated with the appropriate signal pulses.

5. The device of embodiment 4, wherein:

the interactions implementing the linear operation comprise a coherent interference between one of the signal pulses and one or more of the other signal pulses and the control circuit controls the linear operation by modulating the intensities and phases of the signal pulses (via modulators 610, 310, 208) inputted into the programmable couplers 312, 1410, 211 between the first OPO and the second OPO.

6. The device of embodiment 5, wherein the type of the linear operation comprises at least one of addition or multiplication.

7. The device of any of the embodiments, wherein the multiplexing in time is implemented by having the first OPO and second OPO each having cavity lengths tuned to allow one of the signal pulses to interact with any other of the signal pulses over a plurality of repetition periods of the signal pulses.

8. The device of any of the embodiments 2-7, wherein the first OPO has a first cavity length configured to support N signal pulses spaced by the fixed repetition period and the second OPO comprises a second cavity length configured to support N+1 signal pulses.

9. The device of any of the embodiments 2-8, wherein:

the nonlinear operations each comprise a nonlinear activation function comprising saturated parametric amplification or suppression of the one of the signal pulses generated from one of the pump pulses, depending on a phase difference between the one of the pump pulses and the signal pulse;

the control circuit sets the amplitude and phase of pump pulses in accordance with the computation schedule to control the nonlinear operations; so that:

the one of the signal pulses experiences an amplification or a suppression that is gated by the one of the pump pulses.

10. The device of any of the embodiments, further comprising a clock 220 controlling the fixed repetition rate of the optical pulses and distribution of the optical pulses in the time bins.

11. The device of embodiment 10, wherein the repetition rate is greater than 10 GHz.

12. The device of embodiment 10 or 11, further comprising:

a time division multiplexer 800 for encoding information on multiple sequences of the optical pulses with a repetition rate in the range of 1-100 GHz, using modulators programmable to encode information on each of the pulses, and a combiner 802 for combining the pulse sequences into one sequence of pulses with the fixed repetition rate in the range of 0.1-10 THz.

13. The device of embodiment 12, further comprising:

a time division demultiplexer comprising splitter 804 for splitting the one sequence of pulses into a plurality of pulse sequences with a lower repetition rates;

a plurality of switches 806; and a plurality of detectors 808 for measuring the analog optical pulse amplitudes or phases of the optical pulses selected by the switches.

14. The device of any of the embodiments, wherein the second OPO is replaced with a virtual memory 1102, 1408 comprising an electronic circuit (e.g., FPGA or ASIC or other integrated circuit or processor or chip) programmable to store the analog optical pulse amplitudes.

15. The device of embodiment 14, wherein the memory further comprises:

photodetectors for detecting the optical pulses and outputting RF signals in response thereto; and an RF processor for processing the RF signals.

16. The device of embodiment 15, wherein the memory further comprises:

an analog to digital converter for converting the RF signals to digital signals for storage in the memory; and a digital to analog converter for converting the digital signals to analog signals configured for driving a modulator modulating the optical pulses with the analog optical pulse amplitudes.

17. The device of any of the embodiments 1-16, wherein the control circuit is programmable to implement the processor as an Ising machine, a reservoir computer, a cellular automaton, or for machine learning.

18. The device of any of the embodiments 1-17, further comprising optical gates or electrical gates for modulating the couplers with optical signals or electrical signals.

19. The device 600 of any of the embodiments, wherein the processor and the memory or the couplers are connected via optical fiber 620 or implemented as a photonic integrated circuit (e.g., a photonic integrated circuit or one or more chips comprising the device).

20. The device or method of any of the embodiments 1-19, wherein the processor is implemented as a CIM, and the required matrix multiplication and nonlinear operations are efficiently implemented in the time-multiplexed opto-electronic architecture.

21. The device or method of any of the embodiments 1-20, wherein the processor executes the computation schedule in discrete time increments (the optical pulses are processed in discrete time bins) and the processor uses SHG as the nonlinearity, rather than continuous time and optical parametric amplification as the nonlinearity.

22. The device or method of any of the embodiments 1-20, wherein the non-linearity comprises a non-degenerate process (signal and idler generated at different frequencies) or a degenerate process (signal and idler at same frequency).

23. The device or method of any of the embodiments 1-22, wherein the optical pulses comprise wavelengths from visible to mid-infrared wavelengths including telecom wavelengths, or any wavelength for which the nonlinear material is transparent.

24. The device or method of any of the embodiments 1-23, further comprising a 1-bit interferometer after the main cavity to measure a relative phases between the signal pulses.

26. The device or method of any of the embodiments 1-24, wherein:

the waveguides each have dimensions including the height, the width, and the length minimizing group velocity mismatch (GVM) between the pump and signal pulses so as to provide temporal overlap of the pump and signal pulses, and the pump pulses and signal pulses each comprise an electromagnetic wave confined in and waveguided by the waveguides.

27. The device or method of any of the embodiments 1-26, wherein the nonlinear material comprises lithium niobate, lithium tantalate, Potassium Titanyl Phosphate (KTP), aluminum nitride, gallium arsenide, indium phosphide, or aluminum gallium arsenide.

28. A scalable and flexible architecture for time-multiplexed photonic computing, consisting of two synchronously-pumped pulsed optical parametric oscillators (OPOs) with high-speed programmable couplings between the cavities. One OPO acts as the main cavity in which the computation is executed, and the other OPO acts as a memory cavity for facilitating inter-pulse interactions. Both linear and nonlinear operations can be performed by properly controlling the pump pulses and the forward/backward couplings between the two cavities.

29. The architecture of embodiment 28 performing all-optical computation without constraint by electronic bandwidth, configured for arbitrary problem size without using an impractical number of delay lines, and allowing fully programmable all-to-all connections between pulses.

30. The architecture of embodiment 29 implemented using free space optics, optical fiber components, or photonic integrated circuits.

31. The architecture of any of the embodiments 28-30 configured for solving computational problems such as combinatorial optimization, neuromorphic computing, or cellular automata.

32. An architecture for computing with time-multiplexed optical resonators replacing the optical feedback path of the resonators with an electronic memory, which temporarily stores the optical state before feeding it back into the optical path. This electronic feedback may improve the scalability and the stability of time-multiplexed optical computing.

33. The architecture of embodiment 32, configured to implement reservoir computing, deep neural networks, and coherent optical Ising machines.

34. The device or method of any of the embodiments, wherein the programmable couplers comprise modulators comprising a material (e.g., liquid crystal or nonlinear material, or electro-optic material, or thermo-optic material) thermally or electrically coupled to an electrode, wherein application of a voltage to the electrode controls, e.g., resistive heating, piezoelectric actuation, bi refringence, or electro-optic actuation of the material so as to control a phase or amplitude of the electromagnetic field passing through the material. Such modulator s can be coupled to waveguides carrying the optical pulses, e.g., in an interferometer, to further modulate the phase or amplitude.

35. The device of any of the embodiments including embodiment 3, wherein the a highly nonlinear regime in which the parametric gain is saturated is characterized by the energy of the pump pulse being significantly suppressed when the energy of the signal pulse is large or comparable to the energy of the pump pulse.

36. The device of any of the embodiments including embodiment 3, wherein the highly nonlinear regime in which the parametric gain is saturated is characterized by the pump energy of the pump pulse being suppressed by more than 10% through the parametric amplification.

37. The device of any embodiment including embodiment 2, wherein the memory comprising the second OPO stores the optical pulses in the second cavity.

Method of Using

Figure 20:
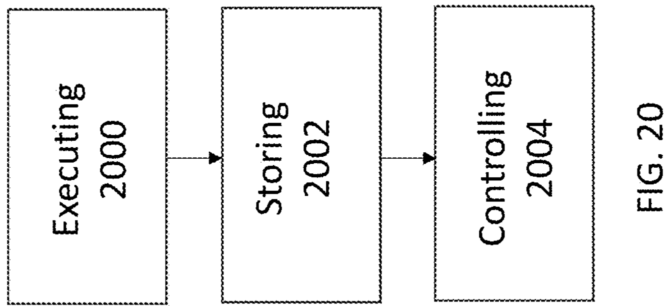
FIG. 20. Flowchart illustrating a method of operating the device.

FIG. 20 is a flowchart illustrating a method of using the device.

Block 2000 represents, using a processor comprising a first OPO, operating on optical pulses to perform computational sequences of linear operations and nonlinear operations each based on a parametric nonlinear optical process in the first OPO.

Block 2002 represents storing or accumulating the analog optical pulse amplitudes of the optical pulses in a memory.

Block 2004 represents controlling a transfer of the analog optical pulse amplitudes between the processor and the memory according to a computation schedule; and wherein information is multiplexed in time by encoding the information onto the analog optical pulse amplitudes of the optical pulses occupying time bins at a fixed repetition rate such that the optical pulses, occupying different ones of the time bins, can be made to interact using appropriate temporal delays.

In one embodiment, a method for computing, comprises:

executing a computation schedule on a processor comprising a first OPO having a second order non-linearity configured to operate on optical pulses transferred from a memory, wherein interactions between the optical pulses in the OPOs perform one or more computations according to the computation schedule;

storing or accumulating one or more of analog amplitudes of the optical pulses from the processor in the memory; and wherein:

the processor comprises a first optical parametric oscillator (OPO) and the memory comprises a second OPO or an electronic circuit;

the OPOs generate the optical pulses comprising signal and/or idler pulses in response to a pump pulse using at least one of a second order process or third order parametric process;

the signal pulses comprise one or more input pulses and one or more output pulses;

the computations each comprise a non-linear operation or a linear operation on each of the input pulses to form the output pulses; and the computation schedule controls the computations by:

selecting each of the operations on each of the input pulses by setting an amplitude of the pump pulse during the operations, such that the OPOs can be operated in either a linear regime in which the parametric gain equals the roundtrip linear loss, or in a highly nonlinear regime in which the parametric gain is saturated; and controlling the transfer of one or more of the signal pulses comprising the analog optical pulse amplitudes between the processor and the memory.

The method of using the device or computing can be implemented using the device of any of the embodiments described herein.

In one or more embodiments described herein (including any of the embodiments 1-37 in method of making section or claims), the coherent interference of optical pulses (e.g., performing linear operations) only occurs in the couplers connecting the processor and memory cavities. The memory cavity serves only to store and accumulate pulses. The process by which the memory cavity "accumulates" results from intermediate steps in the computation is by coherent interference (i.e. summation is just given by the principle of superposition). For example, if we have 2 pulses in the processor cavity with amplitudes x and y, then in order to compute the linear operation a*x+b*y, we do the following: first take the pulse with amplitude x in the processor cavity and program the coupler with modulator level a to compute a*x, then store the result in the memory cavity. Then, take the pulse with amplitude y and program the coupler with the modulator level b to compute b*y, and also allow it to coherently interfere with the stored pulse with amplitude a*x in the memory cavity, hence giving the result a*x+b*y. This pulse with amplitude a*x+b*y in the memory cavity can then be retrieved at any time to be reinjected into the processor cavity to be used for subsequent computations. In this way, we started with pulses of amplitude x and y in the processor cavity, and ended up with a pulse of amplitude a*x+b*y in the processor cavity (and possibly additional pulses), but the memory cavity only need store and accumulate results of intermediate steps in the computation.

Conclusion

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device, comprising:

a programmable photonic processor configured to operate on optical pulses to perform computational sequences of linear operations and nonlinear operations each based on a parametric nonlinear optical process;

a memory coupled to the processor and programmable to store or accumulate the analog optical pulse amplitudes of the optical pulses;

a control circuit controlling the transfer of the analog optical pulse amplitudes between the processor and the memory according to a computation schedule; and wherein information is multiplexed in time by encoding the information onto the analog optical pulse amplitudes of the optical pulses occupying time bins at a fixed repetition rate such that the optical pulses, occupying different ones of the time bins, can be made to interact using appropriate temporal delays to implement the computational sequences of operations.

2. The device of claim 1, wherein the control circuit is programmable to implement the processor as an Ising machine, a reservoir computer, a cellular automaton, or for machine learning.

3. The device of claim 1, further comprising optical gates or electrical gates for modulating programmable couplers, coupling the memory and the processor, with optical signals or electrical signals.

4. The device of claim 1, wherein the processor and the memory or programmable couplers, coupling the memory and the processor, are connected via optical fiber.

5. The device of claim 1, wherein the memory comprises a nonlinear material implementing a parametric nonlinear process and is separately coupled to the processor by a programmable coupler allowing the partial or complete transfer of the optical pulses between the memory and the processor by means of coherent interference of the optical pulses, so that the optical pulse amplitudes may be stored in the memory using the parametric nonlinear process or retrieved in the processor from the memory.

6. A device, comprising:

a programmable photonic processor configured to operate on optical pulses to perform computational sequences of linear operations and nonlinear operations each based on a parametric nonlinear optical process;

a memory coupled to the processor and programmable to store or accumulate the analog optical pulse amplitudes of the optical pulses;

a control circuit controlling the transfer of the analog optical pulse amplitudes between the processor and the memory according to a computation schedule; and wherein information is multiplexed in time by encoding the information onto the analog optical pulse amplitudes of the optical pulses occupying time bins at a fixed repetition rate such that the optical pulses, occupying different ones of the time bins, can be made to interact using appropriate temporal delays, wherein:

the processor comprises a first cavity comprising a first optical parametric oscillator (OPO);

the memory comprises a second cavity comprising a second OPO; and the OPOs each generate the optical pulses comprising signal and/or idler pulses in response to a pump pulse using the parametric nonlinear optical process comprising at least one of a second order process or third order parametric process; and the first cavity and the second cavity are coupled by programmable couplers to allow the partial or complete transfer of the optical pulses between the first cavity and the second cavity by means of coherent interference of the optical pulses.

7. The device of claim 6, wherein:

the signal pulses comprise one or more input pulses and one or more output pulses;

the control circuit implements the computation schedule by:

selecting each of the operations on each of the input pulses, to form the output pulses, by setting an amplitude of the pump pulses in the first OPO and the second OPO during the operations, such that the OPOs can be operated in either a linear regime in which the parametric gain equals the roundtrip linear loss, or in a highly nonlinear regime in which the parametric gain is saturated; and controlling the transfer of one or more of the signal pulses comprising the analog optical pulse amplitudes between the processor and the memory.

8. The device of claim 7, wherein:

the computation schedule comprises a database comprising a sequence of modulator levels each assigned to a different one of the time bins associated with a different one of the signal pulses; and the circuit executes the computation schedule by applying the modulator levels to:

the couplers to control the transfer of the signal pulses; and a modulator to control the amplitude of the pump pulses, and during the time bins associated with the appropriate signal pulses.

9. The device of claim 8, wherein:

the interactions implementing the linear operation comprise a coherent interference between one of the signal pulses and one or more of the other signal pulses in the OPOs; and the control circuit controls the linear operation by modulating the intensities and phases of the signal pulses inputted into the couplers between the first OPO and the second OPO.

10. The device of claim 9, wherein the type of the linear operation comprises at least one of addition or multiplication.

11. The device of claim 9, wherein the multiplexing in time is implemented by having the first OPO and the second OPO each having cavity lengths tuned to allow one of the signal pulses to interact with any other of the signal pulses over a plurality of repetition periods of the pulses.

12. The device of claim 9, wherein the first OPO has a first cavity length configured to support N signal pulses spaced by the fixed repetition period and the second OPO comprises a second cavity length configured to support N+1 signal pulses.

13. The device of claim 7, wherein:

the nonlinear operations each comprise a nonlinear activation function comprising saturated parametric amplification or suppression of the one of the signal pulses generated from one of the pump pulses, depending on a phase difference between the one of the pump pulses and the signal pulse; and the control circuit sets the amplitude and phase of pump pulses in accordance with the computation schedule to control the nonlinear operations; so that:

the one of the signal pulses experiences an amplification or a suppression that is gated by the one of the pump pulses.

14. The device of claim 8, further comprising a clock controlling the fixed repetition rate of the optical pulses and distribution of the optical pulses in the time bins.

15. The device of claim 14, wherein the repetition rate is greater than 10 GHz.

16. The device of claim 14, further comprising:

a time division multiplexer for encoding information on multiple sequences of the optical pulses with a repetition rate in the range of 1-100 GHz, using modulators programmable to encode information on each of the pulses, and a combiner for combining the pulse sequences into one sequence of pulses with the fixed repetition rate in the range of 0.1-10 THz.

17. The device of claim 16, further comprising:

a time division demultiplexer comprising splitter for splitting the one sequence of pulses into a plurality of pulse sequences with a lower repetition rates;

a plurality of switches; and a plurality of detectors for measuring the analog optical pulse amplitudes or phases of the optical pulses selected by the switches.

18. The device of claim 6, wherein the memory comprises a virtual memory comprising an electronic circuit programmable to store the analog optical pulse amplitudes.

19. The device of claim 18, wherein the memory further comprises:

photodetectors for detecting the optical pulses and outputting RF signals in response thereto; and an RF processor for processing the RF signals.

20. The device of claim 19, wherein the memory further comprises:

an analog to digital converter for converting the RF signals to digital signals for storage in the memory; and a digital to analog converter for converting the digital signals to analog signals configured for driving a modulator modulating the optical pulses with the analog optical pulse amplitudes.

21. A method for computing, comprising:

using a processor comprising a first OPO, operating on optical pulses to perform computational sequences of linear operations and nonlinear operations each based on a parametric nonlinear optical process in the first OPO;

storing or accumulating the analog optical pulse amplitudes of the optical pulses in a memory;

controlling a transfer of the analog optical pulse amplitudes between the processor and the memory according to a computation schedule; and wherein information is multiplexed in time by encoding the information onto the analog optical pulse amplitudes of the optical pulses occupying time bins at a fixed repetition rate such that the optical pulses, occupying different ones of the time bins, can be made to interact using appropriate temporal delays to implement the computational sequence of operations.

* * * * *